United States Patent
Galpin et al.

(10) Patent No.: US 12,041,241 B2
(45) Date of Patent: Jul. 16, 2024

(54) METHOD AND DEVICE FOR IMAGE ENCODING AND DECODING WITH A SHIFTED POSITION

(71) Applicant: InterDigital Madison Patent Holdings, SAS, Paris (FR)

(72) Inventors: Franck Galpin, Thorigne-Fouillard (FR); Fabrice Leleannec, Mouazé (FR); Edouard Francois, Bourg des Comptes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 354 days.

(21) Appl. No.: 17/438,836

(22) PCT Filed: Mar. 12, 2020

(86) PCT No.: PCT/US2020/022480
§ 371 (c)(1),
(2) Date: Sep. 13, 2021

(87) PCT Pub. No.: WO2020/190655
PCT Pub. Date: Sep. 24, 2020

(65) Prior Publication Data
US 2022/0159265 A1 May 19, 2022

(30) Foreign Application Priority Data
Mar. 15, 2019 (EP) ..................................... 19305318

(51) Int. Cl.
*H04N 19/139* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/30* (2014.11)

(58) Field of Classification Search
CPC .. H04N 19/137; H04N 19/105; H04N 19/176; H04N 19/30
See application file for complete search history.

(56) References Cited

U.S. PATENT DOCUMENTS

2015/0085929 A1* 3/2015 Chen ...................... H04N 19/52
375/240.16
2016/0219278 A1* 7/2016 Chen .................... H04N 19/503
(Continued)

FOREIGN PATENT DOCUMENTS

EP 2 903 282 A1 8/2015
RU 2 516 220 C2 5/2014
(Continued)

OTHER PUBLICATIONS

Xiu et al. "CE4-related: Mismatch between text specification and reference software on clipping the positions of collocated blocks for alternative temporal motion vector prediction (ATMVP)", (JVET-L0257), Oct. 2018.*

(Continued)

*Primary Examiner* — James T Boylan
(74) *Attorney, Agent, or Firm* — CONDO ROCCIA KOPTIW LLP

(57) ABSTRACT

A method for obtaining a temporal motion vector predictor is disclosed. A new temporal motion vector predictor is obtained by using a motion vector of a block in a collocated image. The block is displaced (with respect spatial location of the current block) by a motion vector coming from a new temporal motion vector predictor (TMVP) process.

27 Claims, 12 Drawing Sheets

(51) Int. Cl.
H04N 19/137 (2014.01)
H04N 19/176 (2014.01)
H04N 19/30 (2014.01)

(56) References Cited

U.S. PATENT DOCUMENTS

2017/0332099 A1* 11/2017 Lee .................... H04N 19/51
2022/0232219 A1* 7/2022 Zhao .................. H04N 19/119

FOREIGN PATENT DOCUMENTS

| WO | 2010/078146 A2 | 7/2010 |
| WO | 2017/087751 A1 | 5/2017 |
| WO | 2017/131904 A1 | 8/2017 |

OTHER PUBLICATIONS

Anonymous, "High Efficiency Video Coding", ITU-T Telecommunication Standardization Sector of ITU, Series H: Audiovisual and Multimedia Systems Infrastructure of Audiovisual Services—Coding of Moving Video, Recommendation ITU-T H.265, Oct. 2014, 540 pages.

Chen et al., "Algorithm Description for Versatile Video Coding and Test Model 3 (VTM 3)", Joint Video Experts Team (JVET) of ITU-T SG 16 WP 3 and ISO/IEC JTC1/SC29/WG11, Document: JVET-L1002-v1, 12th Meeting, Macao, China, Oct. 3, 2018, 48 pages.

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Document: JVET-M1002-v2, 13th Meeting, Marrakech, Morocco, Jan. 9, 2019, 62 pages.

Jang et al., "Non-CE2: Simplified subblock motion derivation for SbTMVP", Joint Video Experts Team (JVET) of ITU-T SG 16 WP 3 and ISO/IEC JTC 1/SC 29/WG 11, Document: JVET-M0343, 13th Meeting, Marrakech, Morocco, Jan. 9, 2019, 5 pages.

Joint Video Exploration (JVET), ITU-T SG 16 WP3 and ISO/IEC JTC 1/SC 29/WG11, 6$^{th}$ Meeting, JVET-F1001-v2, Hobart, Australia, Mar. 7-Apr. 7, 2017, 49 pages.

* cited by examiner

METHOD AND DEVICE FOR IMAGE ENCODING AND DECODING WITH A SHIFTED POSITION

CROSS REFERENCE TO RELATED APPLICATIONS

This application is the national stage entry under 35 U.S.C. § 371 of International Application PCT/US2020/022480, filed Mar. 12, 2020, which was published in accordance with PCT Article 21(2) on Sep. 24, 2020, in English, and which claims the benefit of European Patent Application No. 19305318.8, filed Mar. 15, 2019.

1. TECHNICAL FIELD

At least one of the present embodiments generally relates to a method and a device for image encoding and decoding, and more particularly, to a method and a device for encoding and decoding information representative of motion in images.

2. BACKGROUND ART

To achieve high compression efficiency, video coding schemes usually employ predictions and transforms to leverage spatial and temporal redundancies in a video content. During an encoding, images of the video content are divided into blocks of pixels, these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

Basically, a sub-block encoded using inter prediction, i.e. a block encoded using an inter mode, is represented by a residual block and a motion information indicating where finding a predictor sub-block. In the last generations of video compression standards (for example in the international standard entitled Versatile Video Coding (VVC) under development by a joint collaborative team of ITU-T and ISO/IEC experts known as the Joint Video Experts Team (JVET) or in the standard HEVC (ISO/IEC 23008-2—MPEG-H Part 2, High Efficiency Video Coding/ITU-T H.265)), compression gains were obtained by predicting not only the texture of sub-blocks but also the motion information.

Motion information prediction is mainly based on the assumption that the motion of a sub-block is generally correlated to the motion of other sub-blocks located in its neighborhood. The definition of a neighborhood of a sub-block is therefore a key point of the motion information prediction. Indeed, this neighborhood should be sufficiently large to insure the best possible motion information predictor is in this neighborhood, but without being too large to limit a cost of signaling said motion information predictor.

It is desirable to propose solutions allowing improving the motion information prediction, i.e. insuring that the used neighborhood comprises the best candidates for motion information prediction.

3. BRIEF SUMMARY

In a first aspect, one or more of the present embodiments provide a method for decoding, the method comprising: identifying a region, called collocated region, of a first reference image collocated with a current block to decode of a current image; obtaining a first motion vector pointing on a second reference image from a position in or in a neighborhood of said collocated region; obtaining a position, called shifted position, in the second reference image, by applying a displacement to a position in the current block based on the first motion vector; determining if a second motion vector is available at the shifted position, and if available, obtaining a third motion vector based on the second motion vector intended to be inserted in a list of motion vector predictor candidates used to reconstruct a motion vector of the current block.

In a second aspect, one or more of the present embodiments provide a method for encoding, the method comprising: identifying a region, called collocated region, of a first reference image collocated with a current block to decode of a current image; obtaining a first motion vector pointing on a second reference image from a position in or in a neighborhood of said collocated region; obtaining a position, called shifted position, in the second reference image, by applying a displacement to a position in the current block based on the first motion vector; determining if a second motion vector is available at the shifted position, and if available, obtaining a third motion vector based on the second motion vector intended to be inserted in a list of motion vector predictor candidates used to reconstruct a motion vector of the current block.

In an embodiment of the method according to the first or the second aspect, the first motion vector is rescaled before being used to obtain the shifted position to ensure the first motion vector points on the second reference image.

In an embodiment of the method according to the first or the second aspect, when the shifted position is out of a constrained area, the shifted position is clipped to be in the shifted area.

In an embodiment of the method according to the first or the second aspect, when the shifted position is out of a constrained area, the third motion vector is based on the first motion vector.

In an embodiment of the method according to the first or the second aspect, when no first motion vector pointing on the second reference image can be obtained from a position in or in a neighborhood of said collocated region, the method comprises determining if a spatial motion vector is available in the list of motion vector predictor candidates used to decode a motion vector of the current block and, if a spatial motion vector is available, fixing the first motion vector to a value depending on the available spatial motion vector.

In an embodiment of the method according to the first or the second aspect, when no first motion vector pointing on the second reference image can be obtained from a position in or in a neighborhood of said collocated region, the method comprises fixing the first motion vector to the spatial motion vector.

In an embodiment of the method according to the first or the second aspect, the first motion vector is obtained from a position in a neighborhood of said collocated region, and the method further comprises: obtaining a fourth motion vector pointing on the second reference image from a position in said collocated region; obtaining a position, called second shifted position, in the second reference image, by applying a displacement to a position in the current block based on the fourth motion vector; determining if a fifth motion vector is available at the second shifted position, and if available, obtaining a sixth motion vector based on the fifth motion vector intended to be inserted in a list of motion vector predictor candidates used to reconstruct a motion vector of the current block; and, selecting a first available motion vector in an ordered set of motion vectors to be inserted in the list, said ordered set comprising, at least the third motion vector, the sixth motion vector, the first motion vector and the fourth motion vector when these motion vectors are available.

In an embodiment of the method according to the first or the second aspect, the ordered set further comprises, when available, a motion vector derived from the position in said collocated region.

In an embodiment of the method according to the first or second aspect, the current block is divided in sub-blocks; the obtaining of a shifted position comprises obtaining a shifted position for each sub-block by applying a displacement to a position in the sub-block based on the first motion vector; a third motion vector being obtained for each sub-block if a second motion vector is available at the shifted position corresponding to said sub-block.

In a third aspect, one or more of the present embodiments provide a device for decoding, the device comprising electronic circuitry adapted for: identifying a region, called collocated region, of a first reference image collocated with a current block to decode of a current image; obtaining a first motion vector pointing on a second reference image from a position in or in a neighborhood of said collocated region; obtaining a position, called shifted position, in the second reference image, by applying a displacement to a position in the current block based on the first motion vector; determining if a second motion vector is available at the shifted position, and if available, obtaining a third motion vector based on the second motion vector intended to be inserted in a list of motion vector predictor candidates used to reconstruct a motion vector of the current block.

In a fourth aspect, one or more of the present embodiments provide a device for encoding, the device comprising electronic circuitry adapted for: identifying a region, called collocated region, of a first reference image collocated with a current block to decode of a current image; obtaining a first motion vector pointing on a second reference image from a position in or in a neighborhood of said collocated region; obtaining a position, called shifted position, in the second reference image, by applying a displacement to a position in the current block based on the first motion vector; determining if a second motion vector is available at the shifted position, and if available, obtaining a third motion vector based on the second motion vector intended to be inserted in a list of motion vector predictor candidates used to reconstruct a motion vector of the current block.

In an embodiment of the device according to the third or the fourth aspect, the first motion vector is rescaled before being used to obtain the shifted position to ensure the first motion vector points on the second reference image.

In an embodiment of the device according to the third or the fourth aspect, the shifted position is out of a constrained area, the shifted position is clipped to be in the shifted area.

In an embodiment of the device according to the third or the fourth aspect, when the shifted position is out of a constrained area, the third motion vector is based on the first motion vector.

In an embodiment of the device according to the third or the fourth aspect, when no first motion vector pointing on the second reference image can be obtained from a position in or in a neighborhood of said collocated region, the device comprises electronic circuitry adapted for: determining if a spatial motion vector is available in the list of motion vector predictor candidates used to decode a motion vector of the current block and, if a spatial motion vector is available, fixing the first motion vector to a value depending on the available spatial motion vector.

In an embodiment of the device according to the third or the fourth aspect, when no first motion vector pointing on the second reference image can be obtained from a position in or in a neighborhood of said collocated region, the device comprises electronic circuitry adapted for fixing the first motion vector to the spatial motion vector.

In an embodiment of the device according to the third or the fourth aspect, the first motion vector is obtained from a position in a neighborhood of said collocated region, and the device further comprises electronic circuitry adapted for: obtaining a fourth motion vector pointing on the second reference image from a position in said collocated region; obtaining a position, called second shifted position, in the second reference image, by applying a displacement to a position in the current block based on the fourth motion vector; determining if a fifth motion vector is available at the second shifted position, and if available, obtaining a sixth motion vector based on the fifth motion vector intended to be inserted in a list of motion vector predictor candidates used to reconstruct a motion vector of the current block; and, selecting a first available motion vector in an ordered set of motion vectors to be inserted in the list, said ordered set comprising, at least the third motion vector, the sixth motion vector, the first motion vector and the fourth motion vector when these motion vectors are available.

In an embodiment of the device according to the third or the fourth aspect, the ordered set further comprises, when available, a motion vector derived from the position in said collocated region.

In an embodiment of the device according to the third or the fourth aspect, the current block is divided in sub-blocks; the obtaining of a shifted position comprises obtaining a shifted position for each sub-block by applying a displacement to a position in the sub-block based on the first motion vector; a third motion vector being obtained for each sub-block if a second motion vector is available at the shifted position corresponding to said sub-block.

In a fifth aspect, one or more of the present embodiments provide a signal comprising data generated according to the method for encoding according to the second aspect, or by the device for encoding according to fourth aspect.

In a sixth aspect, one or more of the present embodiments provide a computer program comprising program code instructions for implementing the method according to the first or the second aspect.

In a seventh aspect, one or more of the present embodiments provide information storage means storing program code instructions for implementing the method according to the first or the second aspect.

4. BRIEF SUMMARY OF THE DRAWINGS

5. DETAILED DESCRIPTION

In the following description, some embodiments use tools developed in the context of VVC or in the context of HEVC. However, these embodiments are not limited to the video coding/decoding method corresponding to VVC or HEVC, and applies to other video coding/decoding methods but also to any method in which an image is predicted from another image.

Figure 1:
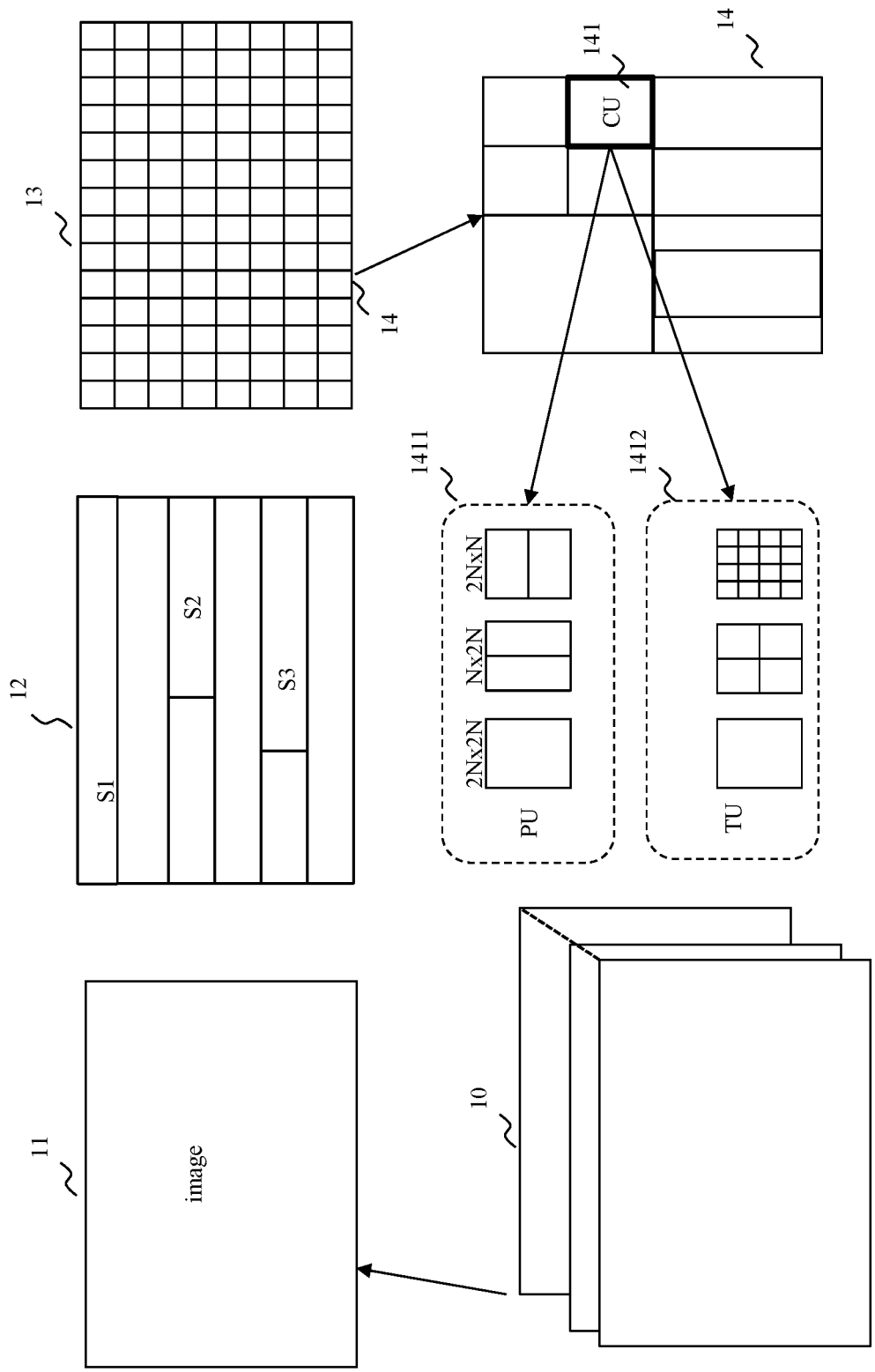
FIG. 1 illustrates an example of partitioning undergone by an image of pixels of an original video.

FIG. 1 illustrates an example of partitioning undergone by an image of pixels 11 of an original video 10. It is considered here that a pixel is composed of three components: a luminance component and two chrominance components. However, the following embodiments are adapted to images constituted of pixels comprising another number of components, for instance grey level images wherein pixels comprise one component, or images constituted of pixels comprising three color components and a transparency component and/or a depth component.

An image is divided in a plurality of coding entities. First, as represented by reference 13 in FIG. 1, an image is divided in a grid of blocks called coding tree units (CTU). A CTU consists of an N×N block of luminance samples together with two corresponding blocks of chrominance samples. N is in general a power of two having, for example, a maximum value of "128". Second, an image is divided into one or more groups of CTU. For example, it can be divided into one or more tile rows and tile columns, a tile being a sequence of CTU covering a rectangular region of an image. In some cases, a tile could be divided into one or more bricks, each of which consisting of at least one row of CTU within the tile. Above the concept of tiles and bricks, another encoding entity, called slice, exists, that can contain at least one tile of an image or at least one brick of a tile.

In the example in FIG. 1, as represented by reference 12, the image 11 is divided into three slices S1, S2 and S3, each comprising a plurality of tiles (not represented).

As represented by reference 14 in FIG. 1, a CTU may be partitioned in the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned. Several types of hierarchical trees can be applied comprising for example a quadtree, a binary tree and a ternary tree. In a quadtree, a CTU (respectively a CU) can be partitioned in (i.e. can be the parent node of) "4" square CU of equal sizes. In a binary tree, a CTU (respectively a CU) can be partitioned horizontally or vertically in "2" rectangular CU of equal sizes. In a ternary tree, a CTU (respectively a CU) can be partitioned horizontally or vertically in "3" rectangular CU. For example a CU of height N and width M is vertically (respectively horizontally) partitioned in a first CU of height N (resp. N/4) and width M/4 (resp. M), a second CU of height N (resp. N/2) and width M/2 (resp. M), and a third CU of height N (resp. N/4) and width M/4 (resp. M).

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of an image, the partitioning is adaptive, each CTU being partitioned in order to optimize a compression efficiency of the CTU criterion.

In some compression method appeared concepts of prediction unit (PU) and transform unit (TU). In that case, the coding entity that is used for prediction (i.e. a PU) and transform (i.e. a TU) can be a subdivision of a CU. For example, as represented in FIG. 1, a CU of size 2N×2N, can be divided in PU 1411 of size N×2N or of size 2N×N. In addition, said CU can be divided in "4" TU 1412 of size N×N or in "16" TU of size (N/2)×(N/2).

In the present application, the term "block" or "image block" or "sub-block" can be used to refer to any one of a CTU, a CU, a PU and a TU. In addition, the term "block" or "image block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably.

Figure 2:
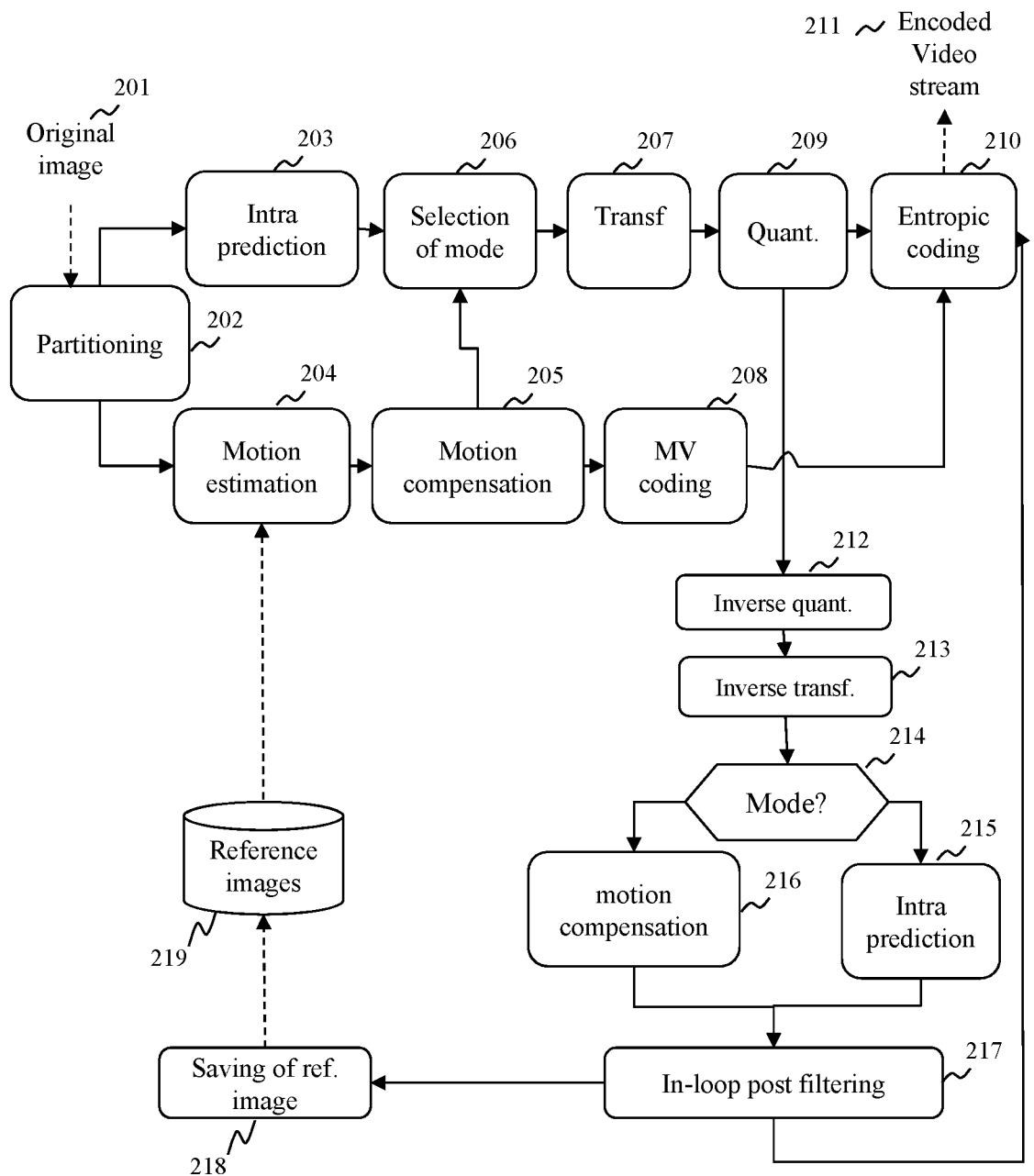
FIG. 2 depicts schematically a method for encoding a video stream executed by an encoding module.

FIG. 2 depicts schematically a method for encoding a video stream executed by an encoding module. Variations of this method for encoding are contemplated, but the method for encoding of FIG. 2 is described below for purposes of clarity without describing all expected variations.

The encoding of a current original image 201 begins with a partitioning of the current original image 201 during a step 202, as described in relation to FIG. 1. The current image 201 is thus partitioned into CTU, CU, PU, TU, etc. For each block, the encoding module determines a coding mode between an intra prediction and an inter prediction.

The intra prediction, represented by step 203, consists of predicting, in accordance with an intra prediction method, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of an image preceding or following the current image, this image being referred to as the reference image. During the coding of a current block in accordance with the inter prediction method, a block of the reference image closest, in accordance with a similarity criterion, to the current block is determined by a motion estimation step 204. During step 204, a motion vector indicating the position of the reference block in the reference image is determined. Said motion vector is used during a motion compensation step 205 during which a residual block is calculated in the form of a difference between the current block and the reference block.

In the first video compression standards, the mono-directional inter prediction mode described above was the only inter mode available. As video compression standards evolved, the family of inter modes has grown significantly and comprises now many different inter modes.

During a selection step 206, the prediction mode optimizing the compression performances, in accordance with a rate/distortion criterion (i.e. RDO criterion), among the prediction modes tested (Intra prediction modes, Inter prediction modes) is selected by the encoding module.

When the prediction mode is selected, the residual block is transformed during a step 207 and quantized during a step 209. Note that the encoding module can skip the transform and apply quantization directly to the non-transformed residual signal.

When the current block is coded according to an intra prediction mode, a prediction direction and the transformed and quantized residual block are encoded by an entropic encoder during a step 210.

When the current block is encoded according to an inter prediction mode, the motion data associated with this inter prediction mode are coded in a step 208.

In general, two modes can be used to encode the motion data, respectively called AMVP (Adaptive Motion Vector Prediction) and Merge.

AMVP basically consists in signaling a reference image(s) used to predict a current block, a motion vector predictor index and a motion vector difference (also called motion vector residual).

The merge mode consists in signaling an index of some motion data collected in a list of motion data predictors. The list is made of "5" or "7" candidates and is constructed the same way on the decoder and encoder sides. Therefore, the merge mode aims at deriving some motion data taken from the merge list. The merge list typically contains motion data associated to some spatially and temporally neighboring blocks, available in their reconstructed state when the current block is being processed. The merge mode can take several forms comprising a regular merge mode and a sub-block merge mode. The list of candidates of each of these two merge modes comprises a temporal motion vector predictor (TMVP).

In the following, we use indifferently the term motion data, motion information or motion vector. Hence, the term motion vector covers either all information representative of the motion of a block, comprising at least one index representative of one reference image and a motion vector represented by an index representative of a motion vector predictor and a difference between the motion vector predictor and the predicted motion vector, or covers only the motion vector.

Figure 5:
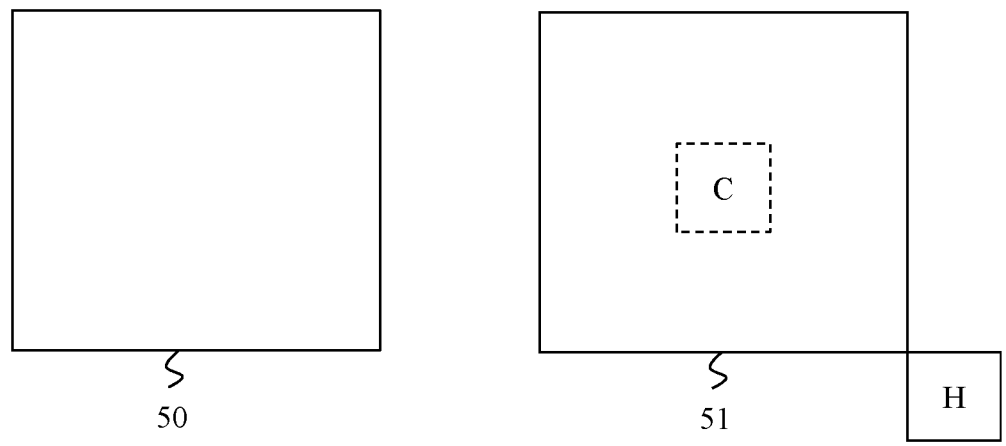
FIG. 5 represents a position of the temporal motion vector predictor of the list of candidates of the regular merge mode.

FIG. 5 represents a position of the temporal motion vector predictor, called regular temporal motion vector predictor (RTMVP) in the following, of the list of candidates of the regular merge mode. The RTMVP is derived from a motion vector corresponding to a position H located at a bottom right corner of a block 51 collocated with the current block 50. If no motion data are available at position H, the RTMVP is derived from the motion data at a center position C of the collocated block 51. The block 51 belongs to a particular reference image signaled in a slice header called collocated image. The RTMVP is then obtained by rescaling the obtained motion vector so that the rescaled motion vector points on a reference image in first position in a reference image buffer (also called decoded picture buffer in the following with reference 219).

Figure 6:
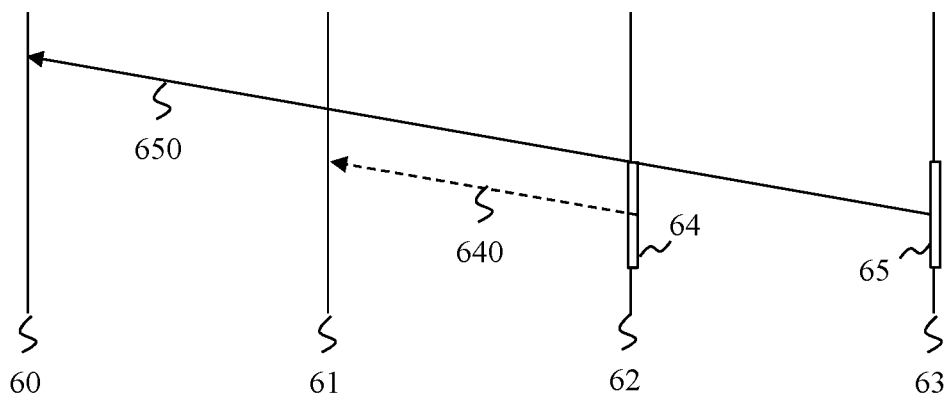
FIG. 6 represents a motion vector scaling of the temporal motion vector predictor of the list of candidates of the regular merge mode.

FIG. 6 represents a motion vector scaling of the temporal motion vector predictor of the list of candidates of the regular merge mode.

In FIG. 6, a current image 62 comprises a current block 64 to encode. The motion data of the current block 64 are encoded in regular merge mode using the motion data of a collocated block 65 in a collocated image 63. The motion data of the collocated block 65 comprise a motion vector 650 pointing to an area in a reference image 60. The RTMVP, corresponding to a motion vector 640, is obtained by rescaling the motion vector 650. As can be noted, the RTMVP 640 has the same direction than the motion vector 650 but points to a reference area in an image 61. Image 61 is the first image in the decoded picture buffer 219.

The sub-block merge mode uses a sub-block temporal motion vector prediction to generate a sub-block temporal motion vector predictor (SbTMVP). The SbTMVP differs from RTMVP in the following two main aspects:

the RTMVP predicts motion at block level while the SbTMVP predicts motion at sub-block level;

whereas the RTMVP is derived from a collocated block in the collocated image, the position of the current block is first shifted before deriving the SbTMVP from a block collocated with the shifted position of the current block of the collocated image. The shift, called motion shift in the following, is obtained from a motion vector of a block spatially neighboring the current block.

Figure 8:
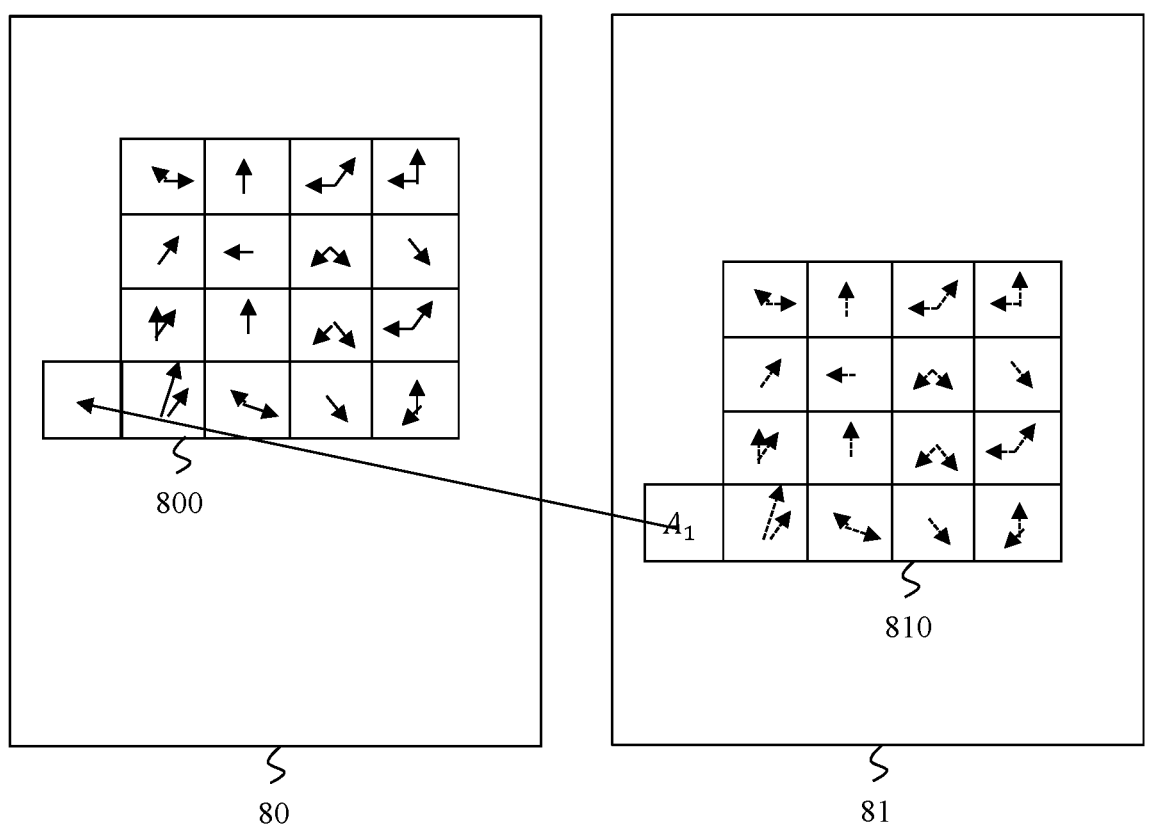
FIG. 8 illustrates an example of a process allowing deriving the sub-block temporal motion vector predictor.

FIG. 8 illustrates an example of a process allowing deriving the sub-block temporal motion vector predictor.

Figure 7:
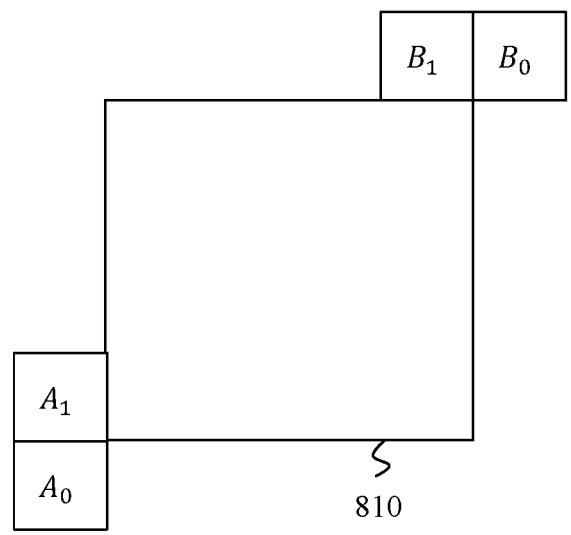
FIG. 7 represents the spatially neighboring blocks considered in the sub-block temporal motion vector prediction process.

The sub-block motion vector prediction predicts the motion vectors of sub-blocks within a current block 810 of a current image 81 in two steps:

In the first step, blocks spatially neighboring the current block 810 are examined. FIG. 7 represents the spatially neighboring blocks considered in the sub-block temporal motion vector prediction process. As can be seen in FIG. 7, four blocks are considered, two blocks A1 and A0 located on the bottom left corner of block 810 and two blocks B1, B0 located at the upper right corner of block 810. The spatially neighboring blocks are examined in the order A1, B1, B0 and A0. In this order, as soon as a spatially neighboring block having a motion vector pointing to the collocated image 80 is identified, this motion vector is selected to be the motion shift to be applied. If no such motion vector is identified from the spatially neighboring blocks A1, B1, B0 and A0, then the motion shift is set to (0, 0), i.e. no motion.

In the second step, the motion shift identified in the first step is applied to the position of the current block 810 (i.e. added to the current block 810' coordinates). Then, sub-block-level motion data (motion vectors and reference indices) are derived from a block 800 of the collocated image 80 collocated with the shifted position of the current block 810. In the example of FIG. 8, the motion shift is assumed to be set to block A1's motion. For each sub-block of the current block 810, the motion data of its corresponding sub-block (the smallest motion grid that covers the center sample) in the block 800 is used to derive the motion data for said sub-block of the current block 810. The SbTMVP derivation is then finalized by applying a temporal motion vector scaling to the motion vectors derived for each sub-block to align the reference images of these derived motion vectors to that of the current block 810.

The sub-block size used in SbTMVP is generally 8×8. In that case, SbTMVP mode is only applicable to block when both width and height of said block are larger than or equal to "8".

As can be seen from the above, when the regular merge mode is applied to a current block of a current image, the RTMVP is a rescaled motion vector of a block of the collocated image collocated with the current block. Hence, the derivation of the RTMVP doesn't take into account the displacement of blocks between the current image and the collocated image.

On the other hand, the SbTMVP is derived from a block of the collocated image collocated with a shifted block obtained by shifting the current block. The shift of the current block is determined from blocks spatially neighboring the current block. A drawback of this approach is that blocks spatially neighboring the current block may not comprise motion data (for example, because they are encoded in intra mode) or may not be available (for example, when the current block is located at the edge of the current image).

Embodiments described below aims at overcoming the above drawbacks.

In particular, at least one embodiment described below aims at creating a new temporal motion vector predictor.

In addition, at least one embodiment described below takes advantages of both TMVP and SbTMVP features.

At least one embodiment uses a displaced motion vector predictor, using a process similar to Sub-block merge mode in regular merge mode, but using a temporal motion vector prediction to displace the motion vector.

At least one embodiment uses a fallback solution as default TMVP when the above motion vector cannot be derived.

At least one embodiment uses a non sub-block motion vector derivation in sub-block merge mode to limit the motion vector derivation process complexity.

At least one embodiment changes the condition of the motion vector displacement derivation constraints to use a fallback solution.

At least one embodiment uses more initial vector for the current block center displacement, using spatial merge candidate in addition to the temporal merge candidate ones.

At least one embodiment uses the temporal merge candidate as an alternate initial vector for the standard SbTMVP sub-block process.

Once predicted, the motion information is next encoded by the entropic encoder during step 210, along with transformed and quantized residual block. Note that the encoding module can bypass both transform and quantization, i.e., the entropic encoding is applied on the residual without the application of the transform or quantization processes. The result of the entropic encoding is inserted in an encoded video stream (i.e. a bitstream) 211.

Note that the entropic encoder can be implemented in a form of a context adaptive binary arithmetic coder (CABAC). CABAC encodes binary symbols, which keeps the complexity low and allows probability modelling for more frequently used bits of any symbol.

After the quantization step 209, the current block is reconstructed so that the pixels corresponding to that block can be used for future predictions. This reconstruction phase is also referred to as a prediction loop. An inverse quantization is therefore applied to the transformed and quantized residual block during a step 212 and an inverse transformation is applied during a step 213. According to the prediction mode used for the current block obtained during a step 214, the prediction block of the current block is reconstructed. If the current block is encoded according to an inter prediction mode, the encoding module applies, when appropriate, during a step 216, a motion compensation to a reference block using the motion information of the current block. If the current block is encoded according to an intra prediction mode, during a step 215, the prediction direction corresponding to the current block is used for reconstructing the reference block of the current block. The reference block and the reconstructed residual block are added in order to obtain the reconstructed current block.

Following the reconstruction, an in-loop post-filtering intended to reduce the encoding artefacts is applied, during a step 217, to the reconstructed block. This post-filtering is called in-loop post-filtering since this post-filtering occurs in the prediction loop to obtain at the encoder the same reference images as the decoder and thus avoid a drift between the encoding and the decoding processes. For instance, the in-loop post-filtering comprises a deblocking filtering and a SAO (sample adaptive offset) filtering. Parameters representative of the activation or the deactivation of the in-loop deblocking filter and when activated, of characteristics of said in-loop deblocking filter are introduced in the encoded video stream 211 during the entropic coding step 210.

When a block is reconstructed, it is inserted during a step 218 into a reconstructed image stored in the decoded picture buffer (DPB) 219. The reconstructed images thus stored can then serve as reference images for other images to be coded.

Figure 3:
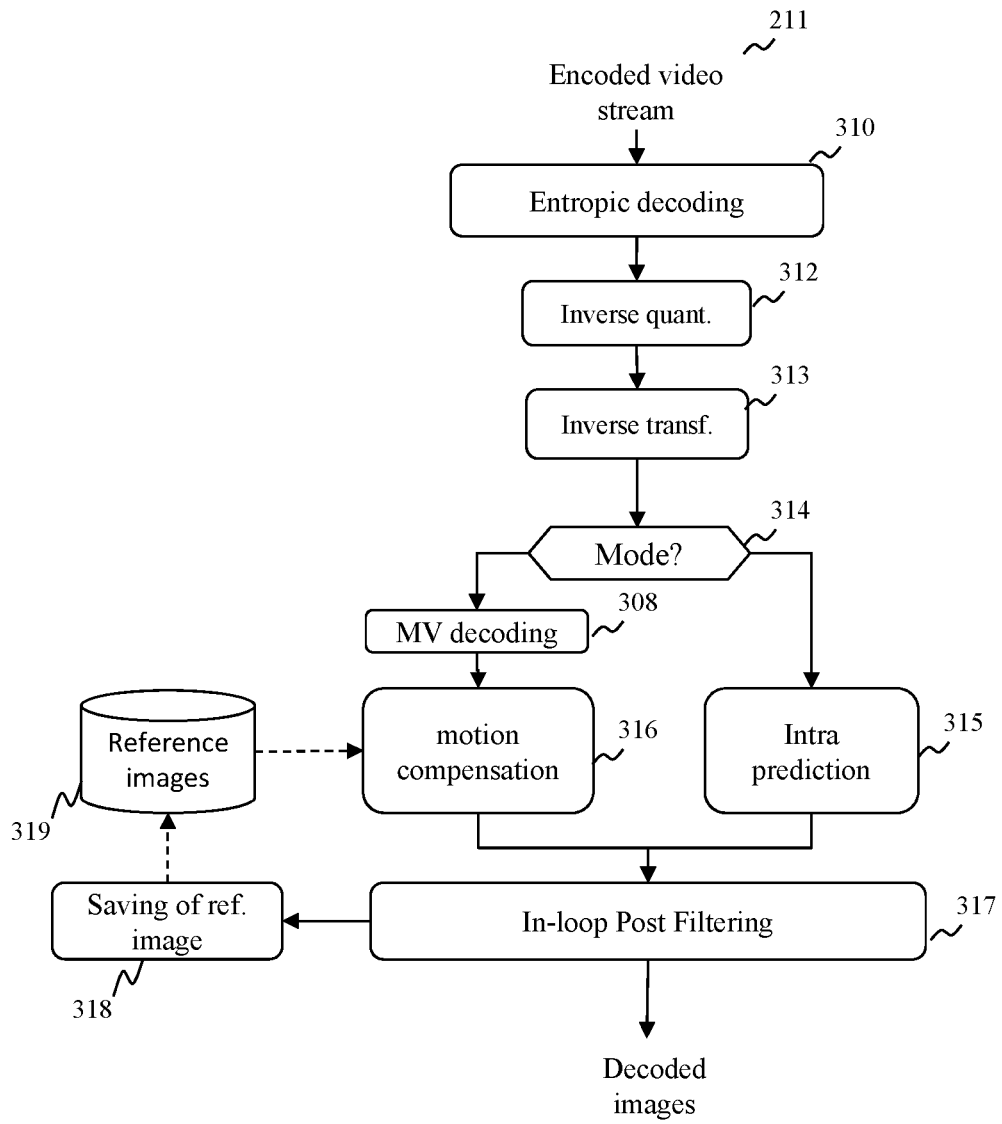
FIG. 3 depicts schematically a method for decoding the encoded video stream (i.e. the bitstream)

FIG. 3 depicts schematically a method for decoding the encoded video stream (i.e. the bitstream) 211 encoded according to method described in relation to FIG. 2. Said method for decoding is executed by a decoding module. Variations of this method for decoding are contemplated, but the method for decoding of FIG. 3 is described below for purposes of clarity without describing all expected variations.

The decoding is done block by block. For a current block, it starts with an entropic decoding of the current block during a step 310. Entropic decoding allows to obtain the prediction mode of the current block.

If the current block has been encoded according to an intra prediction mode, the entropic decoding allows to obtain, information representative of an intra prediction direction and a residual block.

If the current block has been encoded according to an inter prediction mode, the entropic decoding allows to obtain, information representative of motion data and a residual block. When appropriate, during a step 308, the motion data are reconstructed for the current block according to the AMVP or the merge mode. In the merge mode, the motion data obtained by the entropic decoding comprise an index in a list of motion vector predictor candidates. The decoding module applies the same process than the encoding module to construct the list of candidates for the regular merge mode and a sub-block merge mode. With the reconstructed list and the index, the decoding module is able to retrieve a motion vector used to predict the motion vector of a block.

The method for decoding comprises steps 312, 313, 315, 316 and 317 in all respects identical respectively to steps 212, 213, 215, 216 and 217 of the method for encoding. Whereas at the encoding module level, the step 214 comprises a mode selection process evaluating each mode according to a rate distortion criterion and selecting the best mode, step 314 just consists in reading an information representative of a selected mode in the bitstream 211. Decoded blocks are saved in decoded images and the decoded images are stored in a DPB 319 in a step 318. When the decoding module decodes a given image, the images stored in the DPB 319 are identical to the images stored in the DPB 219 by the encoding module during the encoding of said given image. The decoded image can also be outputted by the decoding module for instance to be displayed.

Figure 4A:
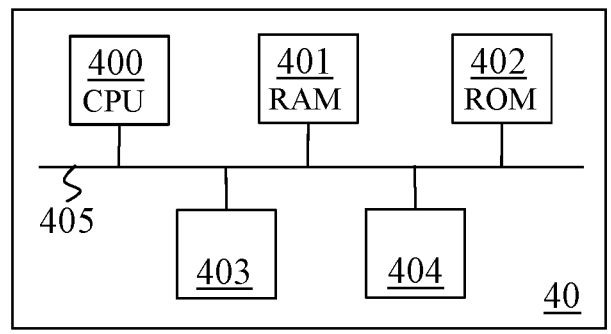
FIG. 4A illustrates schematically an example of hardware architecture of a processing module able to implement an encoding module or a decoding module in which various aspects and embodiments are implemented.

FIG. 4A illustrates schematically an example of hardware architecture of a processing module 40 able to implement an encoding module or a decoding module capable of implementing respectively a method for encoding of FIG. 2 and a method for decoding of FIG. 3 modified according to different aspects and embodiments. The processing module 40 comprises, connected by a communication bus 405: a processor or CPU (central processing unit) 400 encompassing one or more microprocessors, general purpose computers, special purpose computers, and processors based on a multi-core architecture, as non-limiting examples; a random access memory (RAM) 401; a read only memory (ROM) 402; a storage unit 403, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 404 for exchanging data with other modules, devices or equipment. The communication interface 404 can include, but is not limited to, a transceiver configured to transmit and to receive data over communication channel. The communication interface 404 can include, but is not limited to, a modem or network card.

If the processing module 40 implements a decoding module, the communication interface 404 enables for instance the processing module 40 to receive encoded video streams and to provide a decoded video stream. If the processing module 40 implements an encoding module, the communication interface 404 enables for instance the processing module 40 to receive original image data to encode and to provide an encoded video stream.

The processor 400 is capable of executing instructions loaded into the RAM 401 from the ROM 402, from an external memory (not shown), from a storage medium, or from a communication network. When the processing module 40 is powered up, the processor 400 is capable of reading instructions from the RAM 401 and executing them. These instructions form a computer program causing, for example, the implementation by the processor 400 of a decoding method as described in relation with FIG. 3 or an encoding method described in relation to FIG. 2, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 4B:
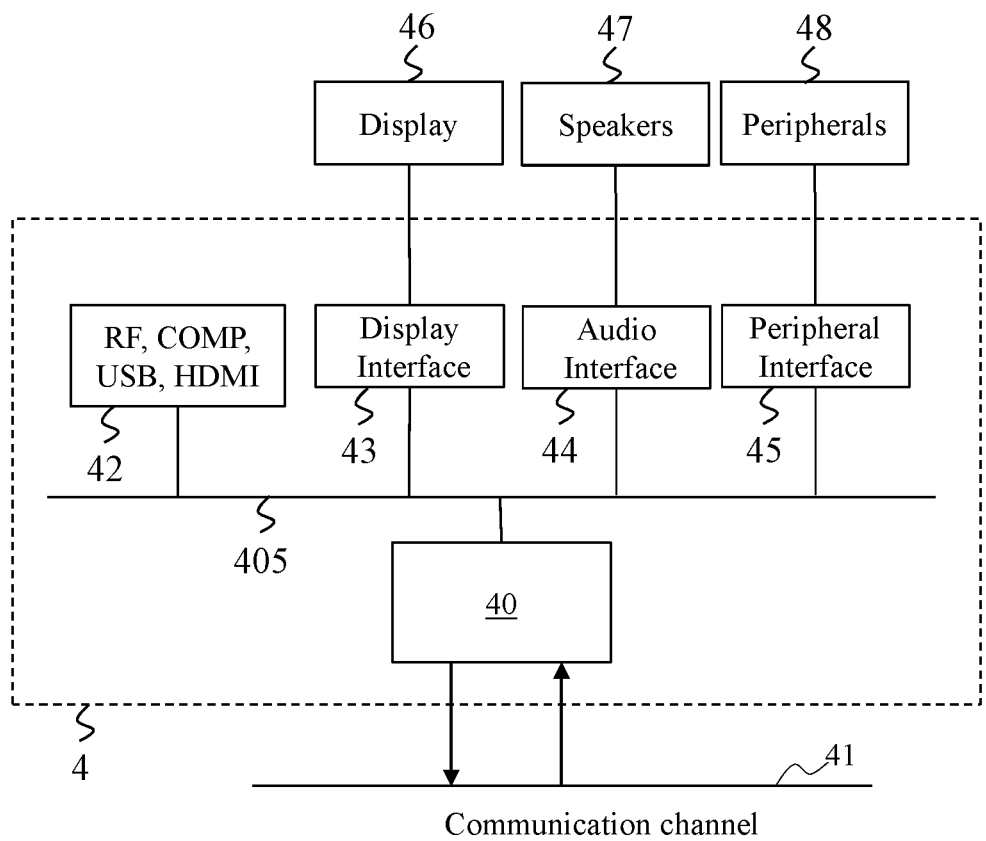
FIG. 4B illustrates a block diagram of an example of a system in which various aspects and embodiments are implemented.

FIG. 4B illustrates a block diagram of an example of a system 4 in which various aspects and embodiments are implemented. System 4 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 4, singly or in combination, can be embodied in a single integrated circuit (IC), multiple ICs, and/or discrete components. For example, in at least one embodiment, the system 4 comprises one processing module 40 that implement a decoding module or an encoding module. But, in another embodiment, the system 4 can comprise a first processing module 40 implementing a decoding module and a second processing module 40 implementing an encoding module or one processing module 40 implementing a decoding module and an encoding module. In various embodiments, the system 40 is communicatively coupled to one or more other systems, or other electronic devices, via, for example, a communications bus or through dedicated input and/or output ports. In various embodiments, the system 4 is configured to implement one or more of the aspects described in this document.

The system 4 comprises at least one processing module 40 capable of implementing one of an encoding module or a decoding module or both.

The input to the processing module 40 can be provided through various input modules as indicated in block 42. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4B, include composite video.

In various embodiments, the input modules of block 42 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 4 to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system 4 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 4, the processing module 40 is interconnected to other elements of said system 4 by the bus 405.

The communication interface 404 of the processing module 40 allows the system 4 to communicate on a communication channel 41. The communication channel 41 can be implemented, for example, within a wired and/or a wireless medium.

Data is streamed, or otherwise provided, to the system 4, in various embodiments, using a wireless network such as a Wi-Fi network, for example IEEE 802.11 (IEEE refers to the Institute of Electrical and Electronics Engineers). The Wi-Fi signal of these embodiments is received over the communications channel 41 and the communications interface 404 which are adapted for Wi-Fi communications. The communications channel 41 of these embodiments is typically connected to an access point or router that provides access to external networks including the Internet for allowing streaming applications and other over-the-top communications. Other embodiments provide streamed data to the system 4 using a set-top box that delivers the data over the HDMI connection of the input block 42. Still other embodiments provide streamed data to the system 4 using the RF connection of the input block 42. As indicated above, various embodiments provide data in a non-streaming manner. Additionally, various embodiments use wireless networks other than Wi-Fi, for example a cellular network or a Bluetooth network.

The system 4 can provide an output signal to various output devices, including a display 46, speakers 47, and other peripheral devices 48. The display 46 of various embodiments includes one or more of, for example, a touchscreen display, an organic light-emitting diode (OLED) display, a curved display, and/or a foldable display. The display 46 can be for a television, a tablet, a laptop, a cell phone (mobile phone), or other devices. The display 46 can also be integrated with other components (for example, as in a smart phone), or separate (for example, an external monitor for a laptop). The other peripheral devices 46 include, in various examples of embodiments, one or more of a stand-alone digital video disc (or digital versatile disc) (DVR, for both terms), a disk player, a stereo system, and/or a lighting system. Various embodiments use one or more peripheral devices 48 that provide a function based on the output of the system 4. For example, a disk player performs the function of playing the output of the system 4.

In various embodiments, control signals are communicated between the system 4 and the display 46, speakers 47, or other peripheral devices 48 using signaling such as AV.Link, Consumer Electronics Control (CEC), or other communications protocols that enable device-to-device control with or without user intervention. The output devices can be communicatively coupled to system 4 via dedicated connections through respective interfaces 43, 44, and 45. Alternatively, the output devices can be connected to system 4 using the communications channel 41 via the communications interface 404. The display 46 and speakers 47 can be integrated in a single unit with the other components of system 4 in an electronic device such as, for example, a television. In various embodiments, the display interface 43 includes a display driver, such as, for example, a timing controller (T Con) chip.

The display 46 and speaker 47 can alternatively be separate from one or more of the other components, for example, if the RF module of input 42 is part of a separate set-top box. In various embodiments in which the display 46 and speakers 47 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations or embodiments described in this application, for example, for determining a temporal motion vector predictor for a coding unit encoding according to a merge mode.

As further examples, in one embodiment "decoding" refers only to entropy decoding (step 310 in FIG. 3). Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy encoding. In various embodiments, such processes also, or alternatively, include processes performed by an encoder of various implementations or embodiments described in this application, for example, for determining a temporal motion vector predictor for a coding unit encoding according to a merge mode.

As further examples, in one embodiment "encoding" refers to the encoding mode selection (step 206 in FIG. 2) and entropy encoding (step 210 in FIG. 2). Whether the phrase "encoding process" is intended to refer specifically to a subset of operations or generally to the broader encoding process will be clear based on the context of the specific descriptions and is believed to be well understood by those skilled in the art.

Note that the syntax elements names, prediction modes name, tools name as used herein, are descriptive terms. As such, they do not preclude the use of other syntax element, prediction mode or tool names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, inferring the information from other information(s), retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, inferring the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, inferring the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals syntax elements or parameters related to a motion vector predictor selected in a list of motion vector for a coding unit encoded in a merge mode. In this way, in an embodiment the same parameters are used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 9:
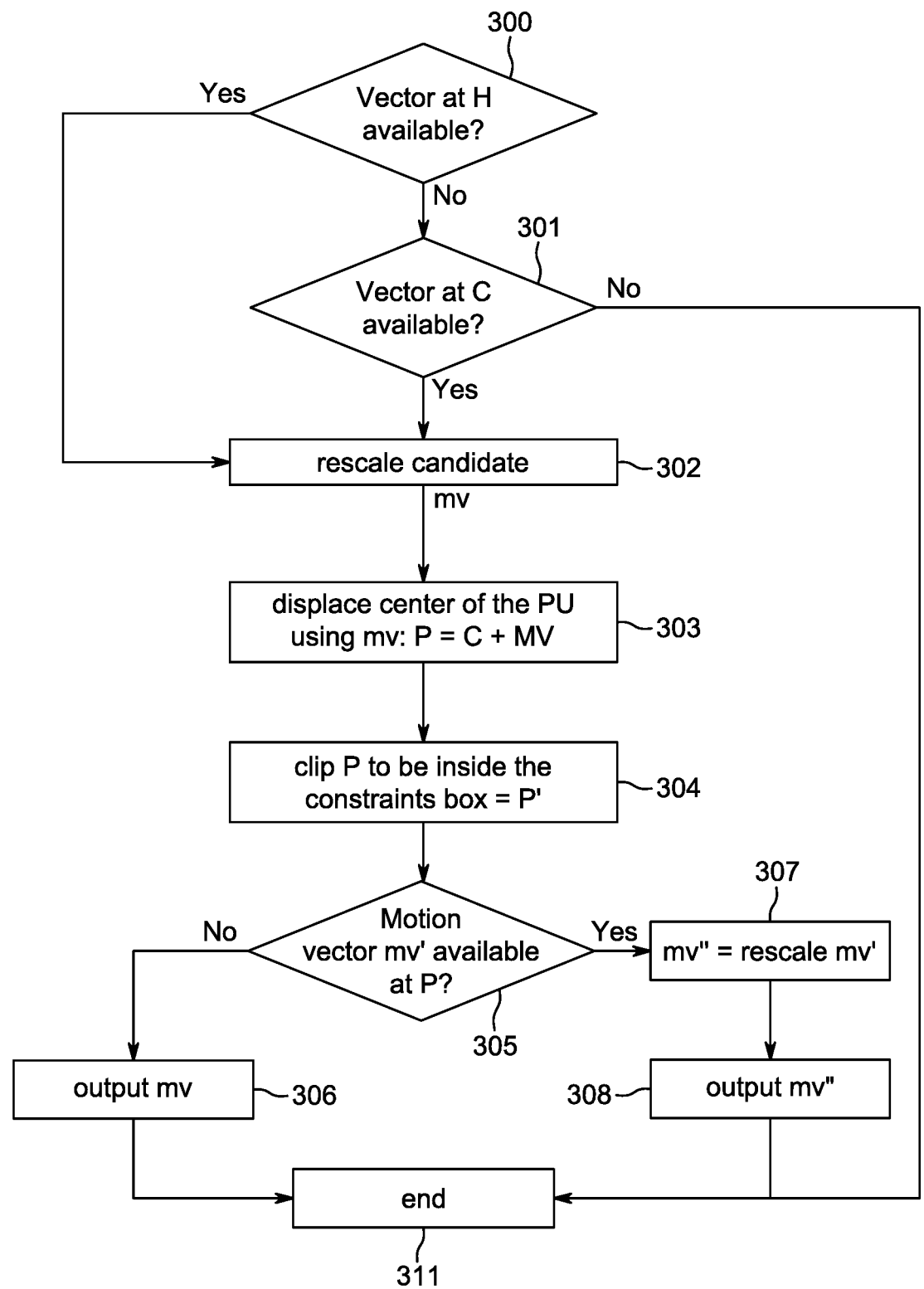
FIG. 9 depicts schematically an overall improved TMVP derivation process.

FIG. 9 depicts schematically an overall improved TMVP derivation process. The process of FIG. 9 is executed on a current block by the processing module 40 when the processing module 40 implements an encoder or a decoder. In particular, the TMVP derivation process is executed during steps 208 and 308. The new TMVP derived from the process of FIG. 9 can be used for example as a TMVP for the regular merge mode.

Before starting the TMVP derivation process, the processing module 40 has identified a block in the collocated image collocated with the current block.

In a step 300, the processing module 40 determines if a motion vector mv can be obtained from the position H of the block collocated with the current block in the collocated image as defined in relation to FIG. 5. If a motion vector mv can be derived from the position H, this motion vector mv is stored as a temporal motion vector by the processing module 40 and step 300 is followed by a step 302.

Otherwise, step 300 is followed by a step 301 during which the processing module 40 determines if a motion vector mv can be derived from the center position C of the block collocated with the current block in the collocated image as defined in relation to FIG. 5. If a motion vector mv can be derived from the center position C, this motion vector mv is stored as a temporal motion vector by the processing module 40 and step 301 is followed by the step 302. Steps 300 and 301 allow obtaining a temporal motion vector from a position in or in the neighborhood of the block collocated with the current block in the collocated image.

If no temporal motion vector can be determined in steps 300 or 301, the processing module 40 stops the TMVP derivation process at a step 311. In that case, no TMVP can be derived by the TMVP derivation process.

In the step 302, since the temporal motion vector mv may point on any image in the reference image buffer, the derived temporal motion vector mv is rescaled by the processing module 40 to ensure that this temporal motion vector mv points to the current reference image (i.e. to the reference image in first position in the reference image buffer).

In a step 303, the rescaled temporal motion vector mv is used by the processing module 40 to displace the center of the current block (represented by position C) at location P=mv+C.

In a step 304, the processing module 40 applies a clipping to the position P to avoid pointing outside a pre-defined area (i.e. for example to avoid pointing outside a CTU comprising the position C). Steps 303 and 304 allow obtaining a position P in the current reference image by applying a displacement to the center position C of the current block based on the temporal motion vector mv.

In a step 305, the processing module 40 determines if a motion vector is available at position P. This motion vector is called "mv'".

If a motion vector mv' is available, step 305 is followed by a step 307. During step 307, the motion vector mv' is rescaled as a motion vector mv" to point to the current reference image and is kept as a final motion vector (i.e. the TMVP) for the TMVP derivation process.

If no motion vector mv' is available, the motion vector mv is kept as the final motion vector (i.e. the TMVP) in a step 306.

Steps 306 and 308 are followed by step 311. In step 311, the TMVP derived from the TMVP derivation process is inserted in the list of motion vector predictor candidates used to encode or decode (i.e. to reconstruct) the motion vector of the current block.

As can be seen, given the availability of the vectors, either mv or mv" are used as a TMVP.

Note that the rescaling process is the same as in HEVC as described earlier.

In an embodiment, the availability of the motion vector at position H (tested at step 300) depends of limits (borders) of the CTU containing the current block. When the bottom-right sub-block corresponding to position H is outside the current CTU, then the motion vector is considered as not available and the motion vector at position C is taken in the collocated image.

In a variant, the sub-block of the current CTU located at the bottom right corner of the current CTU can be used, avoiding checking unnecessary CTU limit constraints.

In another variant, the position C is examined first.

In all cases, if the motion vector does not exist in the collocated image (for example the corresponding sub-block is in intra mode), the next candidate (e.g. at position C when H is the first checked position) is examined.

Figure 12:
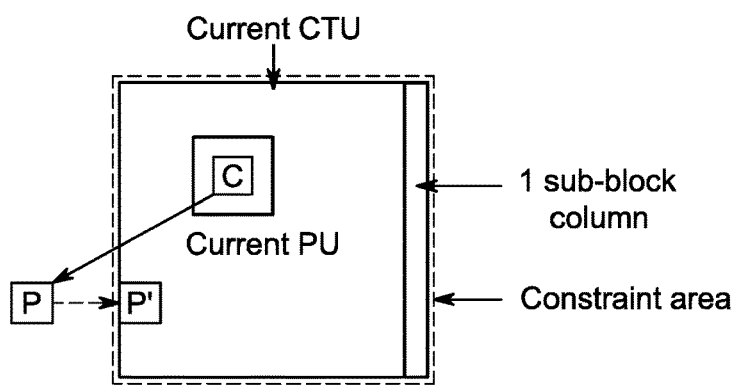
FIG. 12 depicts schematically and example of clipping process.

The clipping process applied for example in step 304, consists in clipping the position P in a given constrained area. In an embodiment, the constrained area corresponds to the CTU comprising the current block to which is added a column of sub-blocks on the right side of this CTU (see FIG. 12). The displaced center C at position P is clipped to be kept inside the constrained area, giving the position P'. The final motion vector (i.e. the TMVP) is then extracted from a sub-block at position P' in the collocated image.

Figure 10:
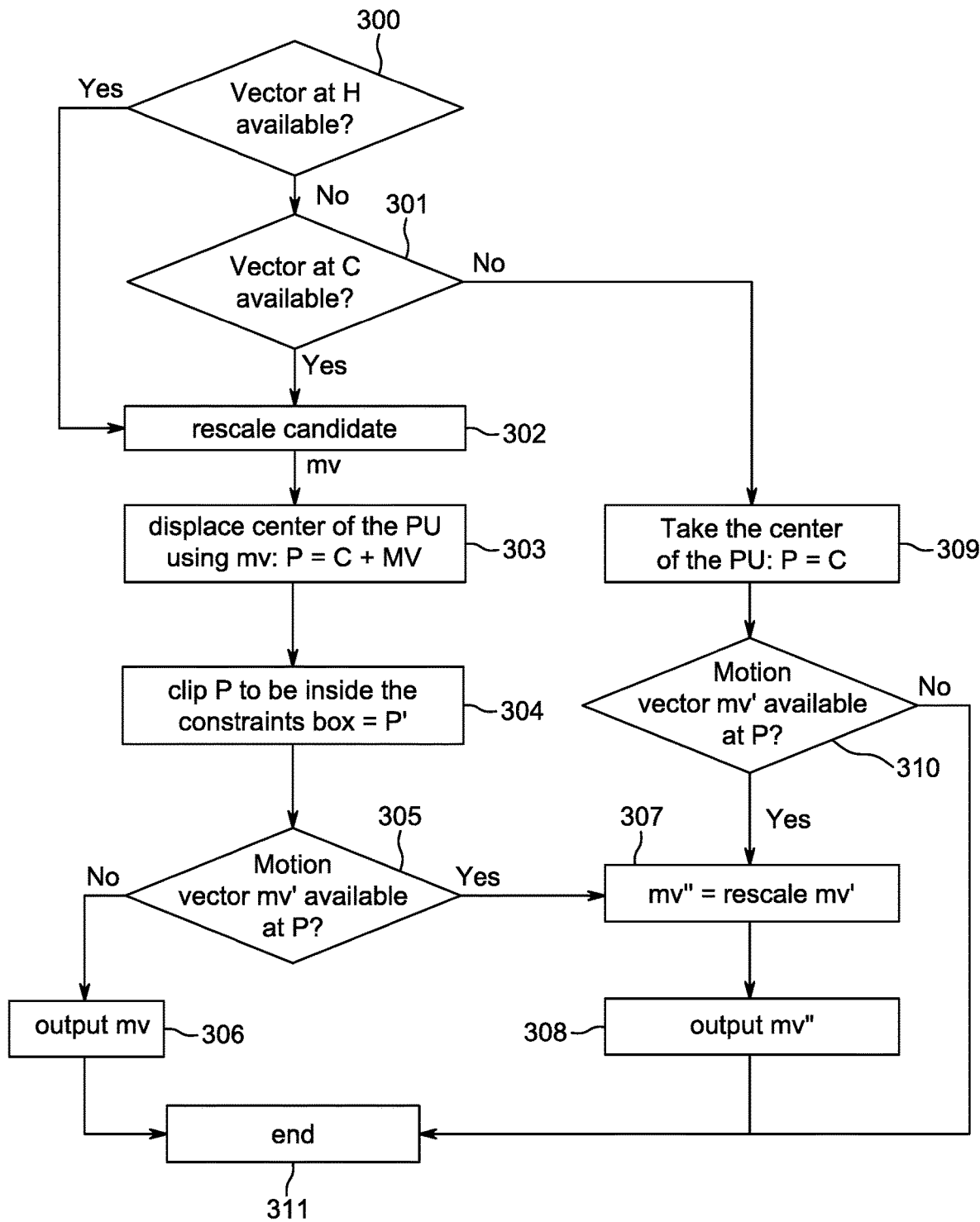
FIG. 10 depicts schematically a first variant of the overall improved TMVP derivation process.

FIG. 10 depicts schematically a first variant of the overall improved TMVP derivation process. The process of FIG. 10 is executed on a current block by the processing module 40 when the processing module 40 implements an encoder or a decoder. In particular, the TMVP derivation process is executed during steps 208 and 308.

The variant of FIG. 10 modifies the process of FIG. 9 when no temporal motion can be found in steps 300 and 301. Compared to the block diagram of FIG. 8, two additional steps 309 and 310 are added between steps 301 and 307. Again, the new TMVP derived from the process of FIG. 10 can be used for example as a TMVP for the regular merge mode.

In the step 309, the processing module 40 takes the center position C as the position P.

In step 310, the processing module 40 checks the availability of the motion vector mv' at position P in the collocated image.

If it is available, the motion vector mv' is scaled to the motion vector mv" in the step 307. Otherwise, no motion vector is obtained from the TMVP derivation process and the process ends at step 311.

Figure 11:
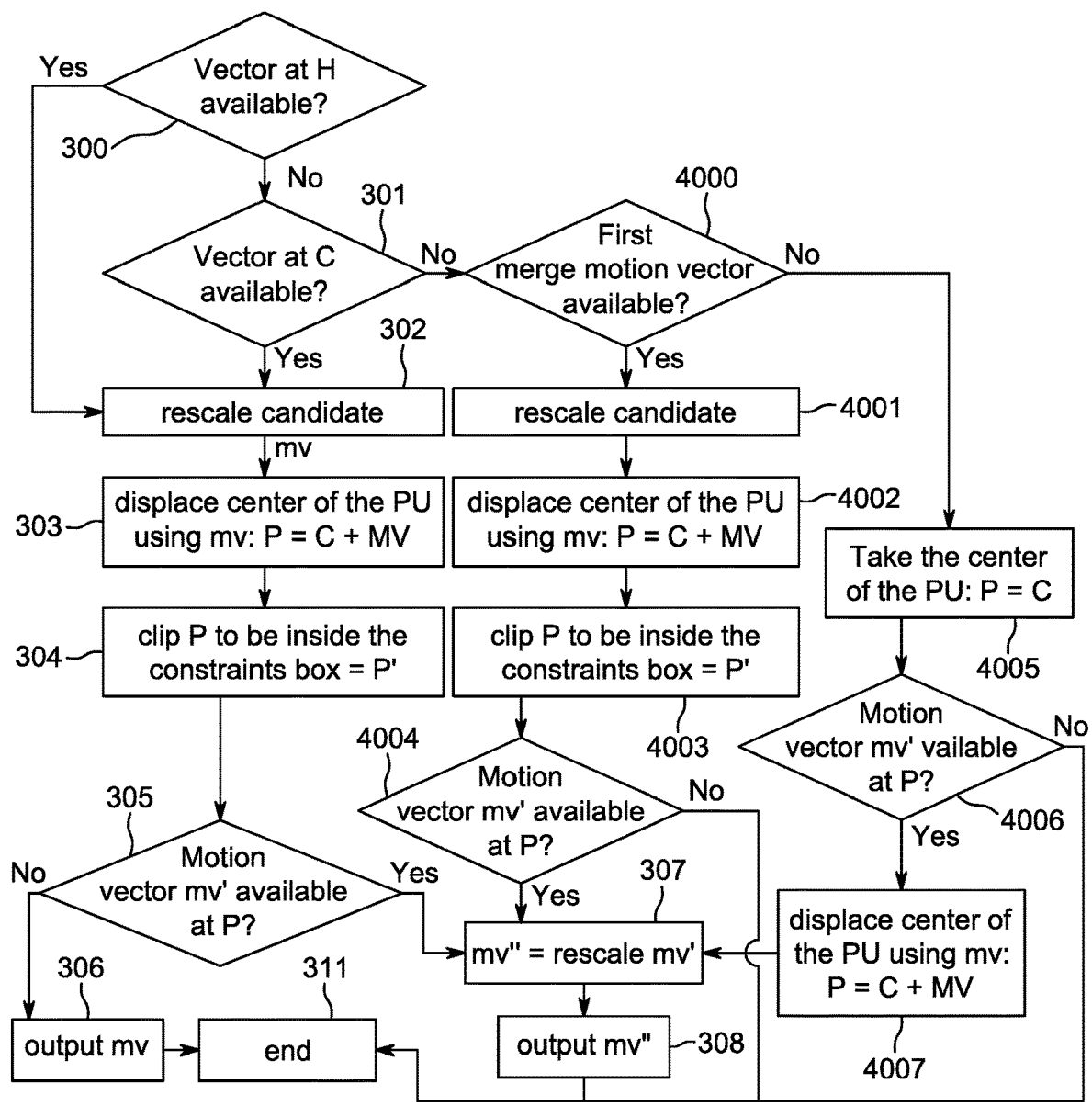
FIG. 11 depicts schematically a second variant of the overall improved TMVP derivation process.

FIG. 11 depicts schematically a second variant of the overall improved TMVP derivation process. The process of FIG. 11 is executed on a current block by the processing module 40 when the processing module 40 implements an encoder or a decoder. In particular, the TMVP derivation process of FIG. 11 is executed during steps 208 and 308.

The variant of FIG. 11 modifies the process of FIG. 9 again when no temporal motion can be found in steps 300 and 301. In that case, in this variant, the first available spatial motion vector of the merge process (or the first candidate of the merge process if it exists) is taken to displace the current block center. If no motion vector can be found at the end, no temporal motion vector is obtained from the TMVP derivation process. Again, the new TMVP derived from the process of FIG. 11 can be used for example as a TMVP for the regular merge mode.

The process of FIG. 11 differs from the process of FIG. 9 as explained below.

When no temporal motion vector is found in steps 300 and 301, step 301 is followed by a step 4000.

In the step 4000, the processing module 40 determines if the first merge motion vector candidate is available in the list of motion vector candidates of the regular merge mode. The first merge motion vector of the list of candidates of the regular merge mode is a spatial motion vector. In an embodiment, instead of determining if the first merge motion vector candidate is available, the processing module 40 determines if at least one spatial candidate is available in the regular merge list and if at least one motion vector candidate is available, the processing module 40 selects the motion vector candidate in first position in said list.

If the first merge motion vector is not available, in a step 4005, the processing module 40 uses the center C of the current block for position P.

In a step 4006, the processing module 40 determines if the motion vector mv' at position P is available.

If mv' is available, the processing module 40 displaces the center of the current block using mv' in a step 4007.

Then, the processing module 40 rescales the motion vector mv' to obtain the motion vector mv" in step 307.

If mv' is not available during step 4006, no motion vector is obtained from the TMVP derivation process and the process stops in step 311.

If the first merge motion vector is available in step 4000, the processing module 40 rescales this motion vector during a step 4001.

In a step 4002, the processing module 40 displaces the current block center position to the position P using the rescaled motion vector.

In a step 4003, the processing module 40 clips the displaced position P.

During a step 4004, the processing module 40 checks the availability of the motion vector mv' at position P in the collocated image. If the motion vector mv' is available, it is rescaled to the motion vector mv" in step 307. If the motion vector mv' is not available, no motion vector is obtained from the TMVP derivation process and the process ends at step 311.

Figure 13:
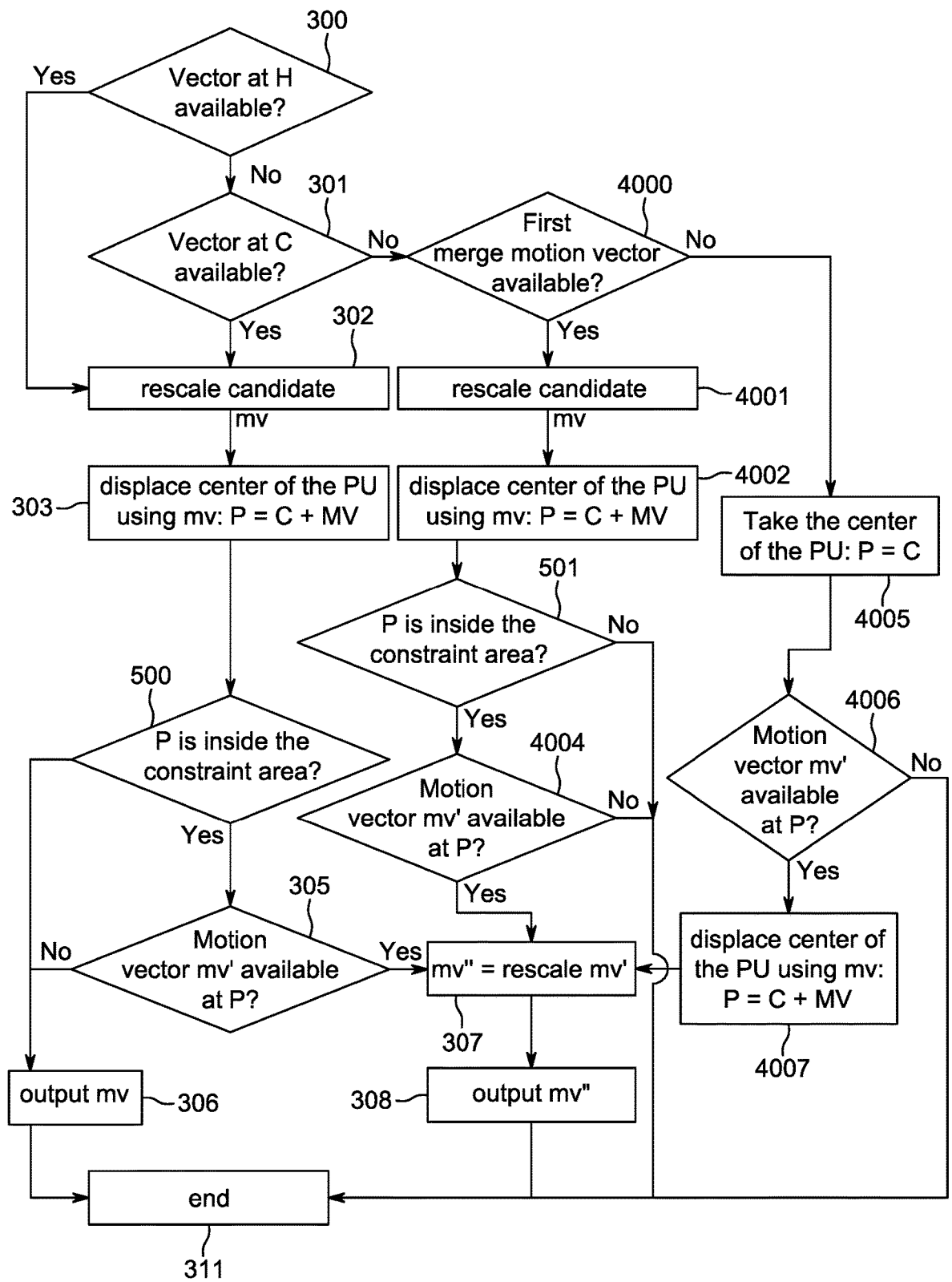
FIG. 13 depicts schematically a third variant of the overall improved TMVP derivation process.

FIG. 13 depicts schematically a third variant of the overall improved TMVP derivation process. The process of FIG. 13 is executed on a current block by the processing module 40 when the processing module 40 implements an encoder or a decoder. In particular, the TMVP derivation process of FIG. 13 is executed during steps 208 and 308.

Again, the new TMVP derived from the process of FIG. 13 can be used for example as a TMVP for the regular merge mode.

An alternate process to the clipping process consists in using a fallback motion vector predictor if the displaced sub-block is outside the constrained area.

FIG. 13 shows a variant of the TMVP derivation process avoiding the clipping process. In this process of FIG. 13 the fallback to the original motion vector mv (when it was selected) is used when the displaced center is lying outside the constrained area. Compared to FIG. 11, two steps (500 and 501) are inserted and consist in checking if the position P is inside the constrained area. Step 500 is inserted between steps 303 and 305/306. If the position P is inside the constrained area in step 500, the processing module executes step 305. Otherwise, the processing module executes step 306.

Step 501 is inserted between step 4002 and step 4004. If the position P is inside the constrained area in step 501, the processing module executes step 4004. Otherwise, step 501 is followed by step 311 and no motion vector is obtained from the TMVP derivation process.

Figure 14:
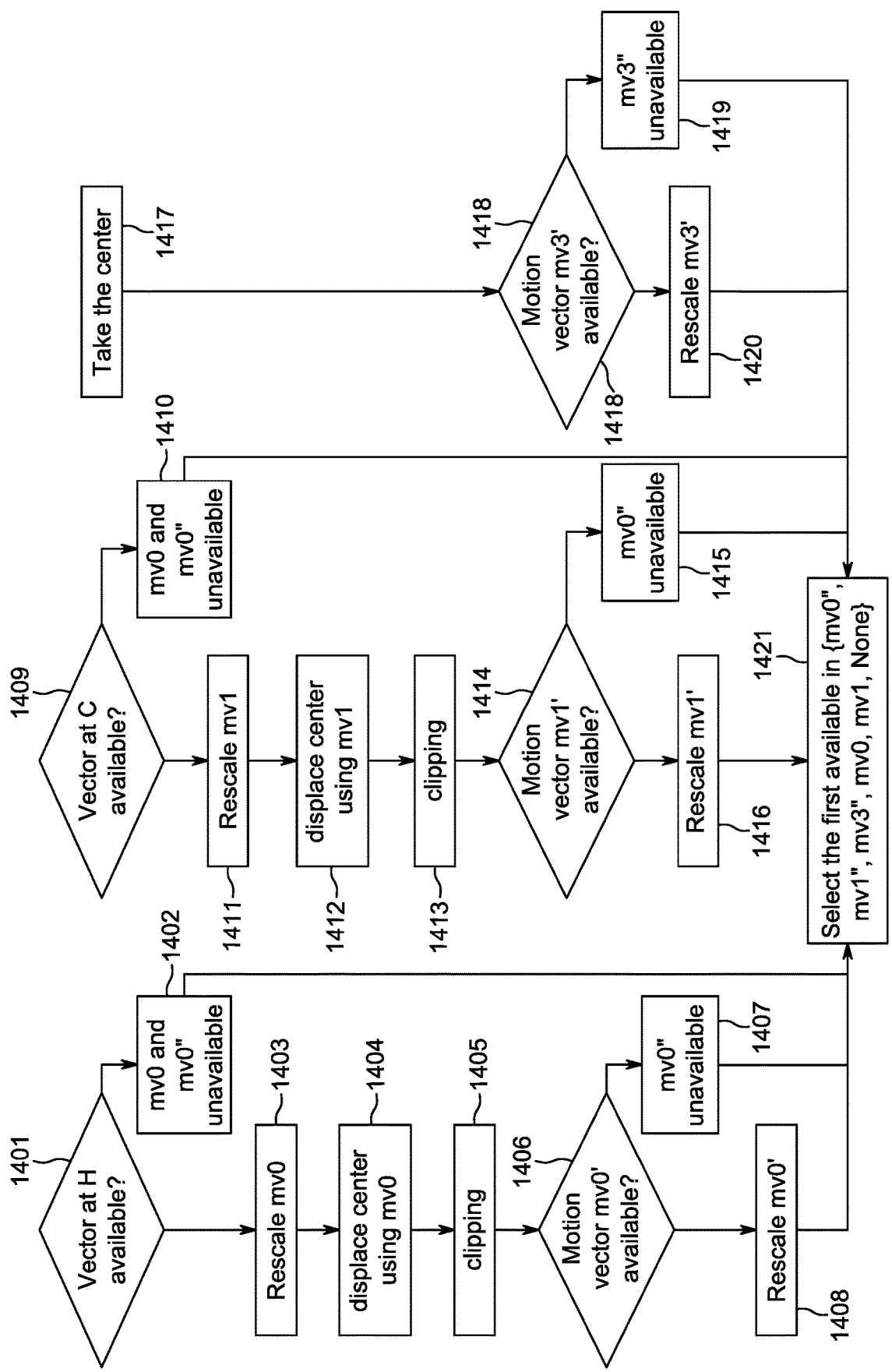
FIG. 14 depicts schematically a fourth variant of the overall improved TMVP derivation process; and, FIG. 15 depicts schematically a fifth variant of the overall improved TMVP derivation process.

FIG. 14 depicts schematically a fourth variant of the overall improved TMVP derivation process. The process of FIG. 14 is executed on a current block by the processing module 40 when the processing module 40 implements an encoder or a decoder. In particular, the TMVP derivation process of FIG. 14 is executed during steps 208 and 308.

Again, the new TMVP derived from the process of FIG. 14 can be used for example as a TMVP for the regular merge mode.

In a step 1401, the processing module 40 determines if a motion vector mv0 at the position H in the collocated image is available.

If a motion vector mv0 is available at the position H, the processing module 40 rescales the motion vector mv0 in a step 1403 so that the rescaled motion vector mv0 points to the current reference image (i.e. to the reference image in first position in the reference image buffer).

In a step 1404, the processing module 40 displaces the center of the current block at a position P=C+mv0.

In a step 1405, the processing module 40 clips the position P if the position P is outside a constrained area.

In a step 1406, the processing module 40 determines if a motion vector mv0' at the position P in the collocated image is available.

If the motion vector mv0' is available at the position P, the processing module rescales the motion vector mv0' to obtain a motion vector mv0" in a step 1408. Step 1408 is followed by step 1421.

If at step 1401 no motion vector is available at the position H, the processing module 40 determines that no motion vector mv0 and mv0" is available during a step 1402. Step 1402 is followed by step 1421.

If at step 1406 no motion vector mv0' is available at the position P, the processing module 40 determines that no motion vector mv0" is available during a step 1407. Step 1407 is followed by step 1421.

In parallel or following steps 1401 to 1408, the processing module executes steps 1409 to 1416.

In a step 1409, the processing module 40 determines if a motion vector mv1 at the position C in the collocated image is available.

If a motion vector mv1 is available at the position C, the processing module 40 rescales the motion vector mv1 in a step 1411 so that the rescaled motion vector mv1 points to the current reference image (i.e. to the reference image in first position in the reference image buffer).

In a step 1412, the processing module 40 displaces the center of the current block at a position P=C+mv1.

In a step 1413, the processing module 40 clips the position P if the position P is outside a constrained area.

In a step 1414, the processing module 40 determines if a motion vector mv1' at the position P in the collocated image is available.

If the motion vector mv1' is available at the position P, the processing module rescales the motion vector mv1' to obtain a motion vector mv1" in a step 1416. Step 1416 is followed by step 1421.

If at step 1409 no motion vector is available at the position C, the processing module 40 determines that no motion vector mv1 and mv1" is available during a step 1410. Step 1410 is followed by step 1421.

If at step 1414 no motion vector mv1' is available at the position P, the processing module 40 determines that no motion vector mv1" is available during step 1415. Step 1415 is followed by step 1421.

In parallel or following steps 1401 to 1408 and/or step 1409 to 1416, the processing module 40 executes steps 1417 to 1420.

In the step 1417, the processing module 40 determines a position P at the center of the current block (P=C).

In a step 1418, the processing module determines if a motion vector mv3" is available at the position P in the collocated image. If a motion vector is available at the position P, the processing module 40 rescales the motion vector mv3" during a step 1420.

Otherwise, the processing module 40 determines that no motion vector mv3" is available during a step 1419. Steps 1419 and 1420 are followed by step 1421.

During step 1421, the processing module 40 selects the first available motion in the ordered set {mv0", mv1", mv3", mv0, mv1, none} as a TMVP. If mv0" is available, the processing module 40 selects mv0" as a TMVP. Otherwise, if mv1" is available, the processing module 40 selects mv1" as a TMVP. Otherwise, if mv3" is available, the processing module 40 selects mv3" as a TMVP. Otherwise, if mv0 is available, the processing module 40 selects mv0 as a TMVP. Otherwise, if mv1 is available, the processing module 40 selects mv1 as a TMVP. Otherwise, no TMVP is selected, i.e. no motion vector is obtained from the TMVP derivation process.

The same process can be applied when the first available spatial motion vector of the merge process (or the first candidate of the merge process if it exists) is used as an initial motion vector as described earlier in relation to FIG. 11 (step 4000).

Figure 15:
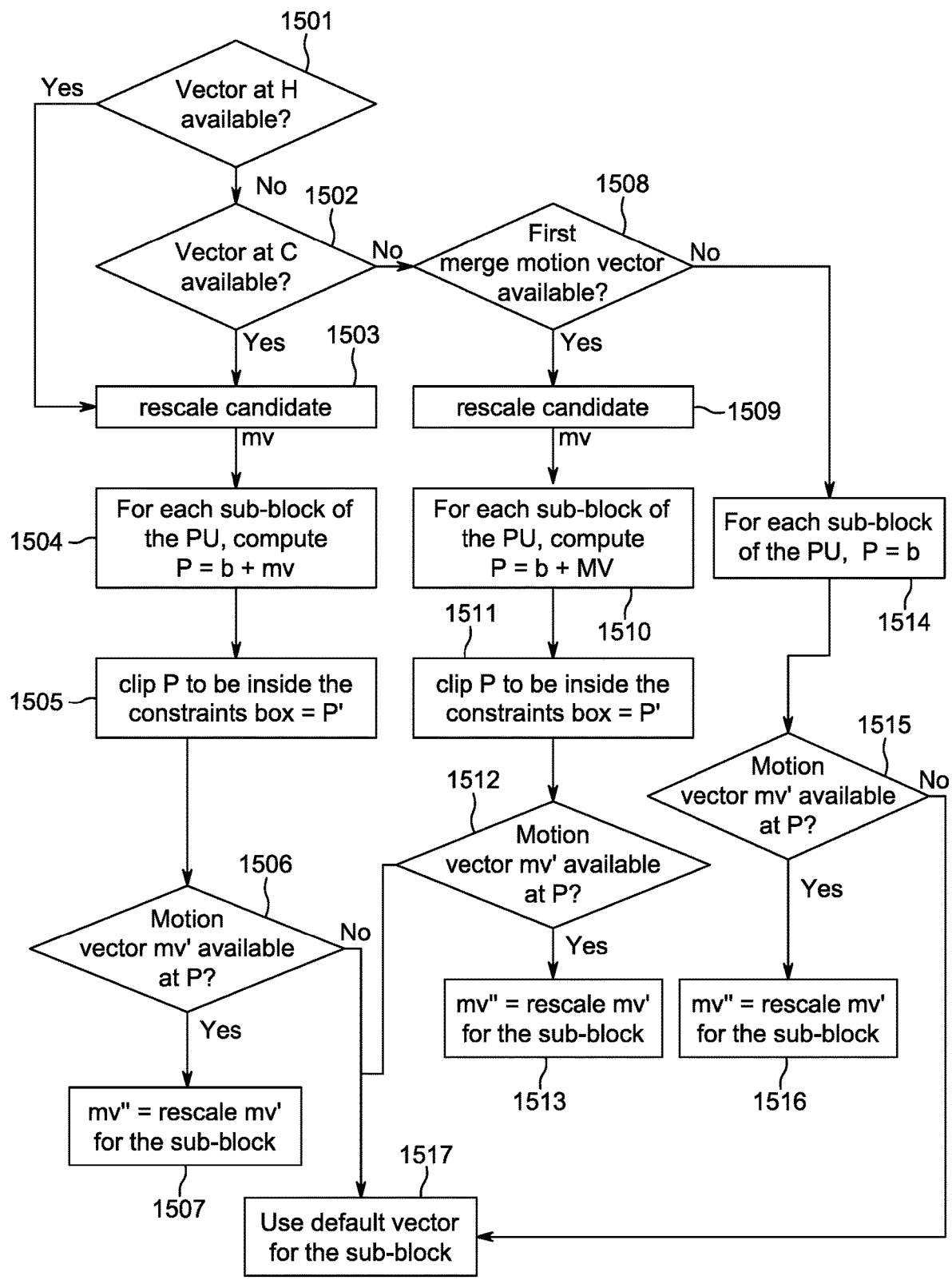

FIG. 15 depicts schematically a fifth variant of the overall improved TMVP derivation process. The process of FIG. 15 is executed on a current block by the processing module 40 when the processing module 40 implements an encoder or a decoder. In particular, the TMVP derivation process of FIG. 15 is executed during steps 208 and 308.

The new TMVP derived from the process of FIG. 15 is particularly adapted to the sub-block merge mode.

In a step 1501, the processing module 40 determine is a motion vector mv is available at the position H in the collocated image. If a motion vector mv is available, step 1501 is followed by a step 1503. Otherwise, the processing module 40 executes a step 1502 during which the processing module 40 determines if a motion vector mv is available at the position C in the collocated image. If a motion vector mv is available, step 1502 is followed by the step 1503.

If no motion vector mv is available at step 1502, step 1502 is followed by a step 1508.

In step 1503, the motion vector mv is rescaled by the processing module 40. Step 1503 is identical to step 302.

In a step 1504, the processing module 40 computes for each sub-block i of the current block a position $P_i=C_i+mv$, where $C_i$ is a position of the center of the $i^{st}$ sub-block of the current block.

In a step 1505, the processing module 40 clips each position $P_i$ to be inside a constrained area, for example inside the CTU comprising the current block.

In a step 1506, the processing module 40 determines for each sub-block i if a motion vector $mv'_i$ is available at the position $P_i$.

Each available motion vector $mv'_i$ is rescaled in step 1507 to obtain a motion vector $mv''_i$. When no motion vector $mv'_i$ is available for a sub-block i, the sub-block i is given a default motion vector in a step 1517, for example $mv''_i=(0, 0)$.

In the step 1508, identical to step 4000, the processing module 40 determines if the first merge motion vector mv is available. If the first merge motion vector mv is available, the processing module 40 rescales this first merge motion vector mv in a step 1509.

In a step 1510, the processing module 40 computes for each sub-block i of the current block a position $P_i=C_i+mv$.

In a step 1511, the processing module 40 clips each position $P_i$ to be inside the constrained area.

In a step 1512, the processing module 40 determines for each sub-block i if a motion vector $mv'_i$ is available at the position $P_i$.

Each available motion vector $mv'_i$ is rescaled in step 1513 to obtain a motion vector $mv''_i$. When no motion vector $mv'_i$ is available for a sub-block i, the sub-block i is given the default motion vector in step 1517.

If at step 1508 the processing module 40 determines that no first merge motion vector mv is available, step 1508 is followed by step 1514.

In the step 1514, the processing module 40 computes for each sub-block i of the current block a position $P_i=C_i$.

In a step 1515, the processing module 40 determines for each sub-block i if a motion vector $mv'_i$ is available at the position $P_i$. Each available motion vector $mv'_i$ is rescaled in step 1516 to obtain a motion vector $mv''_i$. When no motion vector $mv'_i$ is available for a sub-block i, the sub-block i is given a default motion vector in step 1517.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 2, 3, 4A and 4B provide some embodiments, but other embodiments are contemplated and the discussion of FIGS. 2, 3, 4A and 4B does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion vector coding step 208 of a video encoder and or the motion vector decoding step 308 of a decoder. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values, various positions and/or various constrained areas are used in the present application. The specific values, positions, constrained areas are for example purposes and the aspects described are not limited to these specific values, positions and constrained areas.

Further, embodiments can include one or more of the following features, devices, or aspects, alone or in any combination, across various claim categories and types:

Providing a new temporal motion vector predictor;
Obtaining the new temporal motion vector predictor by using a motion vector of a block in a collocated image, wherein the block is displaced (with respect to a spatial location of the current block) by a motion vector MV0 coming from the original TMVP process;
The new temporal motion vector predictor is possibly subject to some temporal rescaling;
Clipping the displacement of the block to be inside a constrained area;
Applying the original TMVP process in the case where the temporal motion vector predictor does not meet some constraints, e.g. points outside a constrained area;
Obtaining a new sub-block temporal motion vector predictor by using a motion vector of a block in a collocated image as an initial motion vector instead of a motion vector of a spatially neighboring block;
Obtaining a new subblock temporal motion vector predictor by applying the initial motion vector on each sub-block;
Inserting in the signaling syntax elements that enable the decoder to identify the motion vector prediction method to use;
A bitstream or signal that includes syntax conveying information generated according to any of the embodiments described;
Inserting in the signaling syntax elements that enable the decoder to adapt motion vector prediction in a manner corresponding to that used by an encoder;
Creating and/or transmitting and/or receiving and/or decoding a bitstream or signal that includes one or more of the described syntax elements, or variations thereof;
Creating and/or transmitting and/or receiving and/or decoding according to any of the embodiments described;
A method, process, apparatus, medium storing instructions, medium storing data, or signal according to any of the embodiments described;
A TV, set-top box, cell phone, tablet, or other electronic device that performs adaptation of motion vector prediction according to any of the embodiments described;
A TV, set-top box, cell phone, tablet, or other electronic device that performs adaptation of motion vector prediction according to any of the embodiments described, and that displays (e.g. using a monitor, screen, or other type of display) a resulting image;
A TV, set-top box, cell phone, tablet, or other electronic device that selects (e.g. using a tuner) a channel to receive a signal including an encoded image, and performs adaptation of motion vector prediction according to any of the embodiments described;
A TV, set-top box, cell phone, tablet, or other electronic device that receives (e.g. using an antenna) a signal over the air that includes an encoded image, and performs adaptation of motion vector prediction according to any of the embodiments described.

The invention claimed is:

1. A method for decoding, the method comprising:
identifying, in a first reference image, a block collocated with a current block to decode of a current image;
obtaining a first motion vector from a position in the collocated block or from a position in a neighborhood of the collocated block, the first motion vector pointing to a second reference image;
obtaining a shifted position by displacing a center position of the current block based on the first motion vector;
determining if a second motion vector is available at the shifted position in the first reference image, and if available, scaling the second motion vector to obtain a third motion vector pointing to the second reference image; and
inserting the third motion vector in a list of motion vector predictor candidates used to reconstruct a motion vector of the current block.

2. The method of claim 1, wherein obtaining the first motion vector comprises:
obtaining an intermediate motion vector associated with the position in the collocated block or in the neighborhood of the collocated block and scaling the intermediate motion vector to obtain the first motion vector to ensure the first motion vector points to the second reference image.

3. The method of claim 1, wherein, when the shifted position is out of a constrained area, the shifted position is clipped to be in the constrained area.

4. The method of claim 1, wherein, when the shifted position is out of a constrained area, the third motion vector is based on the first motion vector.

5. The method of claim 1, wherein, when no first motion vector pointing to the second reference image can be obtained from a position in the collocated block or from a position in the neighborhood of the collocated block, the method comprises determining if a spatial motion vector is available in the list of motion vector predictor candidates used to decode a motion vector of the current block and, if the spatial motion vector is available, fixing the first motion vector to a value depending on the available spatial motion vector.

6. The method of claim 1, wherein, when no first motion vector pointing to the second reference image can be obtained from a position in the collocated block or from a position in the neighborhood of the collocated block, the method comprises fixing the first motion vector to a spatial motion vector.

7. The method of claim 1, wherein the first motion vector is obtained from a position in the neighborhood of the collocated block, and the method further comprises:
obtaining a fourth motion vector pointing to the second reference image from a position in the collocated block;
obtaining a second shifted position, in the second reference image, by applying a displacement to a position in the current block based on the fourth motion vector;
determining if a fifth motion vector is available at the second shifted position, and if available, obtaining a sixth motion vector based on the fifth motion vector intended to be inserted in a list of motion vector predictor candidates used to reconstruct a motion vector of the current block; and
selecting a first available motion vector in an ordered set of motion vectors to be inserted in the list, the ordered set comprising, at least the third motion vector, the sixth motion vector, the first motion vector, and the fourth motion vector when these motion vectors are available.

8. The method of claim 7, wherein the ordered set further comprises, when available, a motion vector derived from the position in the collocated block.

9. The method of claim 1, wherein:
the current block is divided in sub-blocks;
a shifted position is obtained for each sub-block by applying a displacement to a position in the sub-block based on the first motion vector; and
a third motion vector being obtained for each sub-block if a second motion vector is available at the shifted position corresponding to the sub-block.

10. A method for encoding, the method comprising:
identifying, in a first reference image, a block collocated with a current block of a current image;
obtaining a first motion vector from a position in the collocated block or from a position in a neighborhood of the collocated block, the first motion vector pointing to a second reference image;
obtaining a shifted position by displacing a center position of the current block based on the first motion vector;
determining if a second motion vector is available at the shifted position in the first reference image, and if available, scaling the second motion vector to obtain a third motion vector pointing to the second reference image; and
inserting the third motion vector in a list of motion vector predictor candidates used to reconstruct a motion vector of the current block.

11. A device for decoding, the device comprising electronic circuitry adapted for:
identifying, in a first reference image, a block collocated with a current block of a current image;
obtaining a first motion vector from a position in the collocated block or from a position in a neighborhood of the collocated block, the first motion vector pointing to a second reference image;
obtaining a shifted position by displacing a center position of the current block based on the first motion vector;
determining if a second motion vector is available at the shifted position in the first reference image, and if available, scaling the second motion vector to obtain a third motion vector pointing to the second reference image; and
inserting the third motion vector in a list of motion vector predictor candidates used to reconstruct a motion vector of the current block.

12. The device of claim 11, wherein obtaining the first motion vector comprises:
obtaining an intermediate motion vector associated with the position in the collocated block or in the neighborhood of the collocated block and scaling the intermediate motion vector to obtain the first motion vector to ensure the first motion vector points to the second reference image.

13. The device of claim 11, wherein, when the shifted position is out of a constrained area, the shifted position is clipped to be in the constrained area.

14. The device of claim 11, wherein, when the shifted position is out of a constrained area, the third motion vector is based on the first motion vector.

15. The device of claim 11, wherein, when no first motion vector pointing to the second reference image can be obtained from a position in the collocated block or from a position in the neighborhood of the collocated block, the device comprises electronic circuitry adapted for: determining if a spatial motion vector is available in the list of motion vector predictor candidates used to decode a motion vector of the current block and, if the spatial motion vector is available, fixing the first motion vector to a value depending on the available spatial motion vector.

16. The device of claim 11, wherein, when no first motion vector pointing to the second reference image can be obtained from a position in the collocated block or from a position in the neighborhood of the collocated block, the device comprises electronic circuitry adapted for fixing the first motion vector to a spatial motion vector.

17. The device of claim 11 wherein the first motion vector is obtained from a position in the neighborhood of the collocated block, and the device further comprises electronic circuitry adapted for:
obtaining a fourth motion vector pointing to the second reference image from a position in the collocated block;
obtaining a second shifted position, in the second reference image, by applying a displacement to a position in the current block based on the fourth motion vector;
determining if a fifth motion vector is available at the second shifted position, and if available, obtaining a sixth motion vector based on the fifth motion vector intended to be inserted in a list of motion vector predictor candidates used to reconstruct a motion vector of the current block; and selecting a first available motion vector in an ordered set of motion vectors to be inserted in the list, the ordered set comprising, at least the third motion vector, the sixth motion vector, the first motion vector, and the fourth motion vector when these motion vectors are available.

18. The device of claim 11, wherein:
the current block is divided in sub-blocks;
a shifted position is obtained for each sub-block by applying a displacement to a position in the sub-block based on the first motion vector; and
a third motion vector being obtained for each sub-block if a second motion vector is available at the shifted position corresponding to the sub-block.

19. A device for encoding, the device comprising electronic circuitry adapted for:
identifying, in a first reference image, a block collocated with a current block of a current image;
obtaining a first motion vector from a position in the collocated block or from a position in a neighborhood of the collocated block, the first motion vector pointing to a second reference image;
obtaining a shifted position by displacing a center position of the current block based on the first motion vector;
determining if a second motion vector is available at the shifted position in the first reference image, and if available, scaling the second motion vector to obtain a third motion vector pointing to the second reference image; and
inserting the third motion vector in a list of motion vector predictor candidates used to reconstruct a motion vector of the current block.

20. The method of claim 10, wherein obtaining the first motion vector comprises:
obtaining an intermediate motion vector associated with the position in the collocated block or the position in the neighborhood of the collocated block and scaling the intermediate motion vector to obtain the first motion vector to ensure the first motion vector points to the second reference image.

21. The method of claim 10, wherein, when the shifted position is out of a constrained area, the shifted position is clipped to be in the constrained area.

22. The method of claim 10, wherein the first motion vector is obtained from a position in the neighborhood of the collocated block, and the method further comprises:
obtaining a fourth motion vector pointing to the second reference image from a position in the collocated block;
obtaining a second shifted position, in the second reference image, by applying a displacement to a position in the current block based on the fourth motion vector;
determining if a fifth motion vector is available at the second shifted position, and if available, obtaining a sixth motion vector based on the fifth motion vector intended to be inserted in a list of motion vector predictor candidates used to reconstruct a motion vector of the current block; and
selecting a first available motion vector in an ordered set of motion vectors to be inserted in the list, the ordered set comprising, at least the third motion vector, the sixth motion vector, the first motion vector, and the fourth motion vector when these motion vectors are available.

23. The method of claim 10, wherein:
the current block is divided in sub-blocks;
a shifted position is obtained for each sub-block by applying a displacement to a position in the sub-block based on the first motion vector; and
a third motion vector being obtained for each sub-block if a second motion vector is available at the shifted position corresponding to the sub-block.

24. The device of claim 19, wherein obtaining the first motion vector comprises:
obtaining an intermediate motion vector associated with the position in the collocated block or the position in the neighborhood of the collocated block and scaling the intermediate motion vector to obtain the first motion vector to ensure the first motion vector points to the second reference image.

25. The device of claim 19, wherein, when the shifted position is out of a constrained area, the shifted position is clipped to be in the constrained area.

26. The device of claim 19, wherein the first motion vector is obtained from a position in the neighborhood of the collocated block, and the device further comprises electronic circuitry adapted for:
obtaining a fourth motion vector pointing to the second reference image from a position in the collocated block;
obtaining a second shifted position, in the second reference image, by applying a displacement to a position in the current block based on the fourth motion vector;
determining if a fifth motion vector is available at the second shifted position, and if available, obtaining a sixth motion vector based on the fifth motion vector intended to be inserted in a list of motion vector predictor candidates used to reconstruct a motion vector of the current block; and
selecting a first available motion vector in an ordered set of motion vectors to be inserted in the list, the ordered set comprising, at least the third motion vector, the sixth motion vector, the first motion vector, and the fourth motion vector when these motion vectors are available.

27. The device of claim 19, wherein:
the current block is divided in sub-blocks;
a shifted position is obtained for each sub-block by applying a displacement to a position in the sub-block based on the first motion vector; and
a third motion vector being obtained for each sub-block if a second motion vector is available at the shifted position corresponding to the sub-block.

* * * * *